US012623138B2

(12) United States Patent　　　(10) Patent No.:　US 12,623,138 B2
Coovert　　　　　　　　　　　　　　(45) Date of Patent:　May 12, 2026

(54) GAME SYSTEMS AND METHODS

(71) Applicant: The Upper Deck Company, Carlsbad, CA (US)

(72) Inventor: Robert Coovert, Lake Elsinore, CA (US)

(73) Assignee: The Upper Deck Company, Carlsbad, CA (US)

( * ) Notice: Subject to any disclaimer, the term of this patent is extended or adjusted under 35 U.S.C. 154(b) by 141 days.

(21) Appl. No.: 18/609,881

(22) Filed: Mar. 19, 2024

(65) Prior Publication Data

US 2024/0316442 A1　　Sep. 26, 2024

Related U.S. Application Data

(60) Provisional application No. 63/453,747, filed on Mar. 21, 2023.

(51) Int. Cl.
| | |
|---|---|
| *A63F 1/04* | (2006.01) |
| *A63F 3/00* | (2006.01) |
| *A63F 13/537* | (2014.01) |
| *A63F 1/00* | (2006.01) |

(52) U.S. Cl.
CPC .............. *A63F 1/04* (2013.01); *A63F 13/537* (2014.09); *A63F 2001/008* (2013.01); *A63F 2001/0483* (2013.01)

(58) Field of Classification Search
CPC . A63F 1/04; A63F 2001/0425; A63F 3/00075
See application file for complete search history.

(56) References Cited

U.S. PATENT DOCUMENTS

| | | | |
|---|---|---|---|
| 8,448,947 | B2 | 5/2013 | McAndrew et al. |
| 8,814,165 | B2 | 8/2014 | McAndrew et al. |
| 11,083,957 | B2 | 8/2021 | Swiderski |
| 2004/0036220 | A1 * | 2/2004 | Tanaka ...................... A63F 1/04 |
| | | | 273/292 |

(Continued)

OTHER PUBLICATIONS

USPTO; Non-Final Office Action dated Feb. 4, 2026 in U.S. Appl. No. 18/635,824.

(Continued)

*Primary Examiner* — Sepehr Azari
(74) *Attorney, Agent, or Firm* — Snell & Wilmer L.L.P.

(57) ABSTRACT

A method can comprise a first player selecting a player main character card, an opponent selecting an opponent main character card, and/or conducting a battle phase. Each main character card can comprise a hit point value, an attack value, a defense value, and an agility value. The battle phase can comprise the first player rolling a number of attack dice equal to the first player main character's attack value, determining a number of successful attacks based on the attack dice roll, the opponent rolling a number of defense dice equal to the opponent main character's defense value, determining a number of successful blocks based on the defense dice roll, and comparing the number of successful attacks and successful blocks. In response to the number of successful attacks being greater than the number of successful blocks, the method can further comprise decreasing the hit points of the opponent's main character card.

20 Claims, 17 Drawing Sheets

(56)         References Cited

U.S. PATENT DOCUMENTS

2005/0151320 A1\*  7/2005  Gress ........................ A63F 1/00
                                        273/292
2007/0057459 A1\*  3/2007  Silva .................. A63F 3/00075
                                        463/2
2007/0235940 A1\*  10/2007  Stuart ...................... A63F 1/00
                                        273/308
2015/0001798 A1\*  1/2015  Blue ........................ A63F 1/04
                                        273/292
2017/0157500 A1    6/2017  Castro
2018/0304158 A1    10/2018  Miyamae et al.
2022/0305367 A1\*  9/2022  Moteki .................... A63F 1/00

OTHER PUBLICATIONS

USPTO; Notice of Allowance dated Feb. 5, 2026 in U.S. Appl. No. 18/616,549.

\* cited by examiner

300

315

410

420

430

500B

1200

1300

1400

Roll attack dice — 1402

Determine successful attacks — 1404

Roll defense dice — 1406

Determine successful blocks — 1408

Compare agility values — 1410

Reroll attack dice or defense dice based on agility — 1412

Determine battle result — 1414

1900

GAME SYSTEMS AND METHODS

CROSS-REFERENCE TO RELATED APPLICATIONS

This application is a nonprovisional of, and claims priority to and the benefit of, U.S. Provisional Patent Application No. 63/453,747, filed Mar. 21, 2023 and entitled "GAME SYSTEMS AND METHODS," which is hereby incorporated by reference herein.

FIELD

The present disclosure relates generally to game systems and methods.

BACKGROUND

It is a popular entertainment activity for individuals to play organized, instruction-based games, particularly games involving strategy, interacting and inter-related components, characters, and the like. There are, therefore, a wide variety of games employing various modes of play, components (e.g., cards, dice, game surfaces and boards, etc.), and degrees of strategy. Characters and other components of a game system can also be enjoyable for collecting purposes, with cards and other components having varying aesthetic components and degrees of rarity or desirability.

SUMMARY

In various examples, a game system can comprise an original deck of cards, a plurality of value selectors (e.g., dice), and/or a game surface. The original deck of cards can comprise one or more sub-decks, such as an action card deck, a main character deck, and/or an upgraded main character deck. The action card deck can comprise action cards, for example, 40 to 60 action cards. An action card can be or comprise a training card, an equipment card, a single use card, a permanent card, an instant card, and/or an upgrade card. An action card deck can comprise, at least one training card, at least one equipment card, at least one single use card, at least one permanent card, at least one instant card, and/or at least one upgrade card (i.e., any number or combination thereof). A main character deck can comprise one or more main character cards. An upgraded main character deck can comprise one or more upgraded main character cards.

In various examples, a method of gameplay can comprise selecting, by a first player, a player main character card from a player main character deck, and selecting, by a second player, which is an opponent of the first player, an opponent main character card from an opponent main character deck. The player main character deck can comprise at least three player main character cards, wherein the player main character card comprises a player hit point value, a player attack value, a player defense value, and a player agility value. The opponent main character deck can comprise at least three opponent main character cards, wherein the opponent main character card can comprise an opponent hit point value, an opponent attack value, an opponent defense value, and an opponent agility value. The method can further comprise the first player drawing a number of player action cards from a player action deck to create a player hand from which the first player can play cards. The player action deck can comprise between 40 and 60 action cards including at least one training card, at least one equipment card, at least one single use card, at least one permanent card, at least one instant card, and/or at least one upgrade card. The method can further comprise the opponent drawing a number of action cards from an opponent action deck to create an opponent hand from which the opponent can play cards. The opponent action deck can comprise between 40 and 60 action cards including at least one training card, at least one equipment card, at least one single use card, at least one permanent card, at least one instant card, and/or at least one upgrade card.

In various examples, the method can comprise conducting a first battle phase during which the first player is an attacking player and the opponent is a defending player. The first battle phase can comprise the first player rolling a number of player attack dice that is equal to the player attack value of the player main character card; determining a number of successful attacks, wherein a successful attack can occur for each of the player attack dice showing an attack activation value after being rolled; the opponent rolling a number of opponent defense dice that is equal to the opponent defense value of the opponent main character card; determining a number of successful blocks, wherein a successful block occurs for each of the opponent defense dice showing a defense activation value after being rolled; and/or comparing the number of successful attacks and successful blocks. In response to the number of successful attacks being greater than the number of successful blocks, the method can further comprise decreasing the opponent hit points of the opponent main character card by the difference therebetween. In response to the number of successful blocks being greater than or equal to the number of successful attacks, the opponent hit points of the opponent main character card can be maintained. A round of the game can be ended in response to reducing the opponent hit points of the opponent main character card to zero. In response, the method can further comprise positioning the opponent main character card facedown in a results area of the game surface; and/or positioning the player main character card faceup in the results area of the game surface. In various examples, the method can further comprise determining an unblockable number of the player attack dice showing an unblockable attack value, and subtracting the unblockable number from the opponent hit points of the opponent main character card regardless of the number of successful blocks.

In various examples, the method can further comprise conducting a training phase before the first battle phase. The training phase can comprise the first player playing a training card from the player hand. The played training card can increase the player attack value, the player defense value, and/or the player agility value of the first player's main character card. The player attack value, the player defense value, and/or the player agility value are disposed in a value section of the first player's main character card that can be along and proximate a bottom edge of the player main character card. The player attack value can be disposed in a value section first position, the player defense value can be disposed in a value section second position, and the player agility value can be disposed in a value section third position. In various examples, the method can further comprise positioning the training card under the first player's main character card, with a training card bottom edge protruding below the bottom edge of the first player's main character card. A value increase to the player attack value on the training card can be proximate to the training card bottom edge and aligned with the value section first position of the first player's main character card. A value increase to the player defense value on the training card can be proximate to the training card bottom edge and aligned with the value section second position of the first player's main character card. A value increase to the player agility value on the training card can be proximate to the training card bottom edge and aligned with the value section third position of the first player's main character card.

In various examples, the method can further comprise conducting a preparation phase before the first battle phase. The preparation phase can comprise the first player playing an upgrade card from the player hand; the first player selecting an upgraded player main character card associated with the first player's main character card from the first player's upgraded main character deck; and/or upgrading the first player's main character card to the upgraded main character card. The upgraded main character card can comprise at least one of an upgraded player hit point value that is greater than the player hit point value, an upgraded player attack value that is greater than the player attack value, an upgraded player defense value that is greater than the player defense value, or an upgraded player agility value that is greater than the player agility value. In response to upgrading the first player's main character card, rolling the player attack dice during the first battle phase comprises rolling a number of player attack dice equal to the upgraded player attack value.

In various examples, a preparation phase can comprise the first player playing an equipment card from the player hand; and/or placing the equipment card in a first equipment card section of the game surface in response to the playing the equipment card. The equipment card can affect, during one or more turns, the number of the first player's attack dice rolled, the number of opponent's defense dice rolled, the first player's number of successful attacks, the opponent's number of successful blocks, and/or the player attack value, the player defense value, and/or the player agility value of the first player's main character card.

In various examples, a preparation phase can comprise the first player playing a single use card from the player hand; and/or discarding the single use card in response to the playing the single use card. The single use card can comprise an effect that affects the number of the first player's player attack dice rolled, the number of the opponent's defense dice rolled, the first player's number of successful attacks, the opponent's number of successful blocks, and/or the player attack value, the player defense value, and/or the player agility value of the first player's main character card. The effect of the single use card can be determined by a roll of one or more dice. The single use card can be an instant card, wherein the effect of the instant card can be immediate in response to the playing the single use card and can be played in any desired phase of a turn of the game. In various examples, the first player can play up to one action card, wherein the instant card may not count toward such a limit.

In various examples, a preparation phase can comprise the first player playing a permanent card from the player hand; and/or placing the permanent card in a permanent card section of the game surface in response to the playing the permanent card. The permanent card can remain in play until an end of a round. The permanent card can affect the number of the first player's attack dice rolled, the number of opponent's defense dice rolled, the first player's number of successful attacks, the opponent's number of successful blocks, the player attack value, the player defense value, and/or the player agility value of the first player's main character card, and/or the hit points remaining for the first player's main character card.

In various examples, before comparing the number of successful attacks and successful blocks, the first battle phase can further comprise: comparing the player agility value of the first player's main character card and the opponent agility value of the opponent's main character card. In response to the player agility value being greater than the opponent agility value, the first player can reroll a number of the player attack dice equal to the difference therebetween, wherein determining the successful attacks includes the results of the first player rolling, and rerolling, the player attack dice. In response to the opponent agility value being greater than the player agility value, the opponent can reroll a number of the opponent defense dice equal to the difference therebetween, wherein determining the successful blocks includes the results of the opponent rolling, and rerolling, the opponent defense dice.

In various examples, the method can further comprise conducting a second battle phase during which the first player can be the defending player and the opponent can be the attacking player. The second battle phase can comprise the opponent rolling a number of opponent attack dice that is equal to the opponent attack value of the opponent's main character card; determining a number of successful attacks, wherein a successful attack occurs for each of the opponent attack dice showing the attack activation value after being rolled; the first player rolling a number of player defense dice that is equal to the player defense value of the first player's main character card; determining a number of the player's successful blocks, wherein a successful block occurs for each of the player defense dice showing the defense activation value after being rolled; and/or comparing the number of successful attacks and successful blocks for the second battle phase. In response to the opponent's number of successful attacks being greater than the first player's number of successful blocks, decreasing the hit points of the first player's main character card by the difference therebetween. In response to the first player's number of successful blocks being greater than or equal to the opponent's number of successful attacks, maintaining the hit points of the player main character card.

A system, method, and article of manufacture (collectively, "the system") are disclosed relating to game systems and methods. In various examples, the system can be configured to perform operations including displaying, by a processor, a player digital main character card on a graphical user interface (GUI), wherein the player digital main character card comprises a player hit point value, a player attack value, a player defense value, and a player agility value; displaying, by the processor, an opponent digital main character card on the GUI, wherein the opponent digital main character card comprises an opponent hit point value, an opponent attack value, an opponent defense value, and an opponent agility value; and/or conducting a first battle phase.

The first battle phase can comprise presenting, by the processor, a plurality of player digital attack dice on the GUI; rolling, by the processor and a random number generator, a number of the player digital attack dice that is equal to the player attack value; presenting, by the processor, a selected surface of each of the player digital attack dice in response to the rolling the player digital attack dice; determining, by the processor, a number of successful attacks, wherein a successful attack occurs for each of the player digital attack dice showing an attack activation value on the selected surface of each of the player digital attack dice; presenting, by the processor, a plurality of opponent digital defense dice on the GUI; rolling, by the processor and the random number generator, a number of opponent digital defense dice that is equal to the opponent defense value; presenting, by the processor, a selected surface of each of the opponent digital defense dice in response to the rolling the opponent digital defense dice; determining, by the processor, a number of successful blocks, wherein a successful block occurs for each of the opponent digital defense dice showing a defense activation value on the selected surface of each of the opponent digital defense dice; and/or comparing, by the processor, the number of successful attacks and successful blocks. In response to the number of the successful attacks being greater than the number of successful blocks, decreasing, by the processor, opponent hit points of the opponent digital main character card by the difference therebetween. In response to the number of successful blocks being greater than or equal to the number of successful attacks, maintaining, by the processor, the opponent hit points of the opponent digital main character card.

In various examples, the operations can further comprise, before conducting the first battle phase: selecting, by the processor and the random number generator, a number of player digital action cards from a player digital action deck to create a player hand from which the first player can play digital cards; displaying, by the processor, the number of player digital action cards in the player hand faceup on the GUI; selecting, by the processor and the random number generator, a number of opponent digital action cards from an opponent digital action deck to create an opponent hand from which the opponent can play digital cards; and/or displaying, by the processor, the number of opponent digital action cards in the opponent hand facedown on the GUI. The player digital action deck can comprise between 40 and 60 digital action cards including at least one digital training card, at least one digital equipment card, at least one digital single use card, at least one digital permanent card, at least one digital instant card, and/or at least one digital upgrade card. The opponent digital action deck can comprise between 40 and 60 digital action cards including at least one digital training card, at least one digital equipment card, at least one digital single use card, at least one digital permanent card, at least one digital instant card, and/or at least one digital upgrade card.

In various examples, the operations can further comprise, before conducting the first battle phase, conducting a training phase. A training phase can comprise receiving, by the processor, a selection of a digital training card from the player hand, which can increase at least one of the player attack value, the player defense value, and the player agility value; associating, by the processor, the digital training card with the player digital main character card; and/or increasing, by the processor, at least one of the player attack value, the player defense value, and the player agility value based on the digital training card.

In various examples, the operations can further comprise, before conducting the first battle phase, conducting a preparation phase. A preparation phase can comprise receiving, by the processor, a selection of a digital equipment card from the player hand, which comprises an equipment effect; associating, by the processor, the digital equipment card with the player digital main character card; and/or effecting, by the processor, the equipment effect during the first battle phase. The equipment effect can affect, during each turn, at least one of the number of player digital attack dice rolled, the number of opponent digital defense dice rolled, the number of successful attacks, the number of successful blocks, the player attack value, the player defense value, or the player agility value.

BRIEF DESCRIPTION OF THE DRAWINGS

The subject matter of the present disclosure is particularly pointed out and distinctly claimed in the concluding portion of the specification. A more complete understanding of the present disclosure, however, can best be obtained by referring to the detailed description and claims when considered in connection with the drawing figures. In the figures, like referenced numerals can refer to like parts throughout the different figures unless otherwise specified.

DETAILED DESCRIPTION

The detailed description of various examples herein makes reference to the accompanying drawings, which show the various examples by way of illustration. While these various examples are described in sufficient detail to enable those skilled in the art to practice the disclosure, it should be understood that other examples can be realized and that logical, electronic, compositional, and mechanical changes can be made without departing from the spirit and scope of the disclosure. Thus, the detailed description herein is presented for purposes of illustration only and not of limitation. For example, the steps recited in any of the method or process descriptions can be executed in any combination or order and are not limited to the combination and order presented. Moreover, any of the functions or steps can comprise intervening steps therebetween and/or can be outsourced to or performed by one or more third parties. Furthermore, any reference to singular includes plural examples, and any reference to more than one component or step can include a singular component or step. Denotations such as "first," "second," and/or the like do not necessarily or directly indicate a certain order or sequence, but can function as identifiers to identify discrete aspects, and/or associate certain aspects, of a system or method, as dictated by the context in which such denotations are used. Any reference to attached, fixed, connected, or the like can include permanent, removable, temporary, partial, full, and/or any other possible attachment option.

Figure 1:
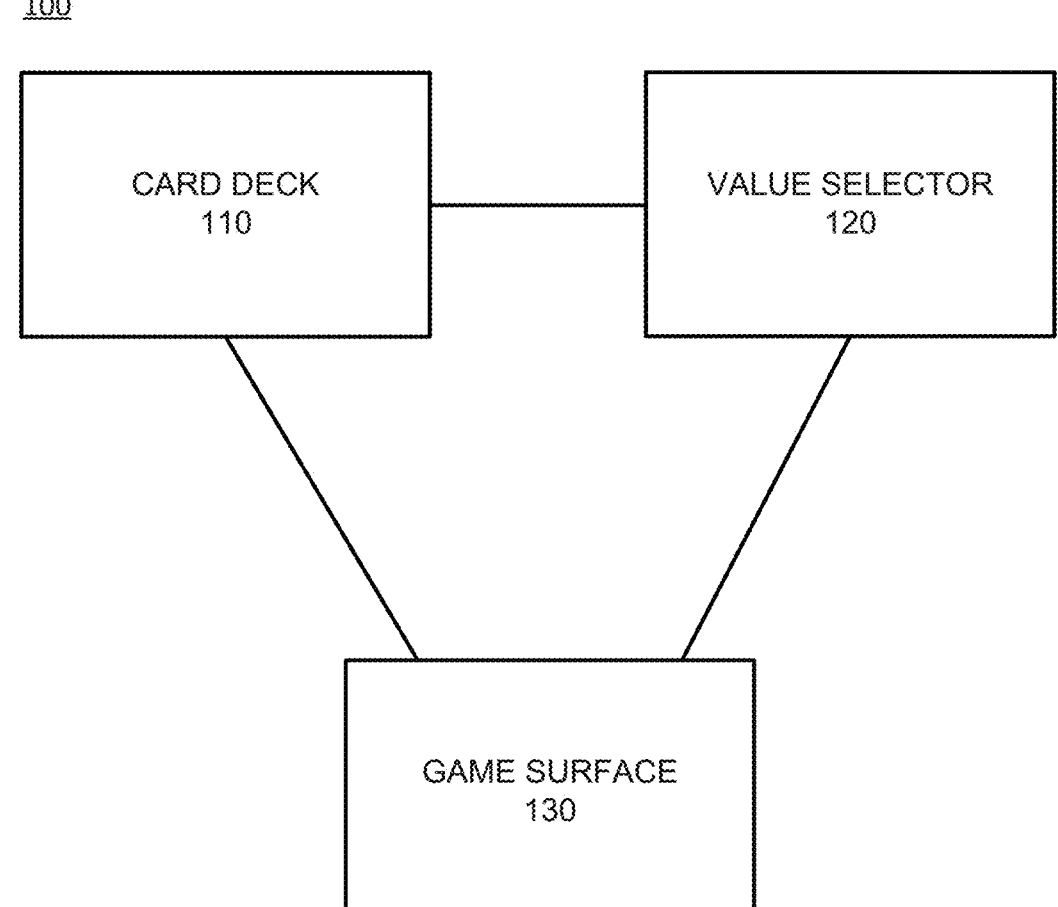
FIG. 1 illustrates a schematic diagram of a game system, in accordance with various examples.

With reference to FIG. 1, a block diagram of an exemplary game system 100 is depicted, in accordance with various examples. In various embodiments, game system 100 can comprise a card deck 110, a value selector 120, and/or a game board or surface 130. The components of game system 100 can interact with one another to determine game actions, scoring, and/or the like. For example, cards in card deck 110, and/or information or images displayed thereon, can dictate a number of value selectors 120 to utilize at various stages of a game, required and/or desired values from value selectors 120, and/or spaces on a game surface 130 upon which to take certain actions within a game.

Figure 3:
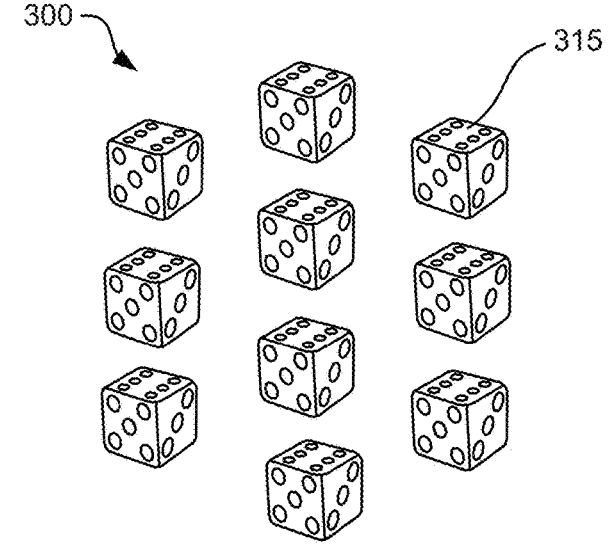
FIG. 3 illustrates a plurality of value selectors (e.g., dice), in accordance with various examples.

With reference to FIGS. 1 and 3, in various examples, game system 100 can comprise one or more value selectors 120. Value selectors can be any suitable item or object, such as dice 300, a spinner and portions of the spinner chart, cards for drawing, and/or any other item or object used to randomly select or receive a value. For example, as part of a player's turn during a game utilizing game system 100, the player can roll one or more dice 300 to receive the randomly selected values therefrom (each randomly selected value being the value on the top or upward-facing surface 315 of each die 300 in response to being rolled). In various examples, dice 300 can be six-sided dice (D6), with each side having a value of 1-6. In various examples, the dice can be any other type of dice, including four-sided dice (D4), eight-sided dice (D8), ten-sided dice (D10), twelve-sided dice (D12), and/or 20-sided dice (D20).

Figure 4:
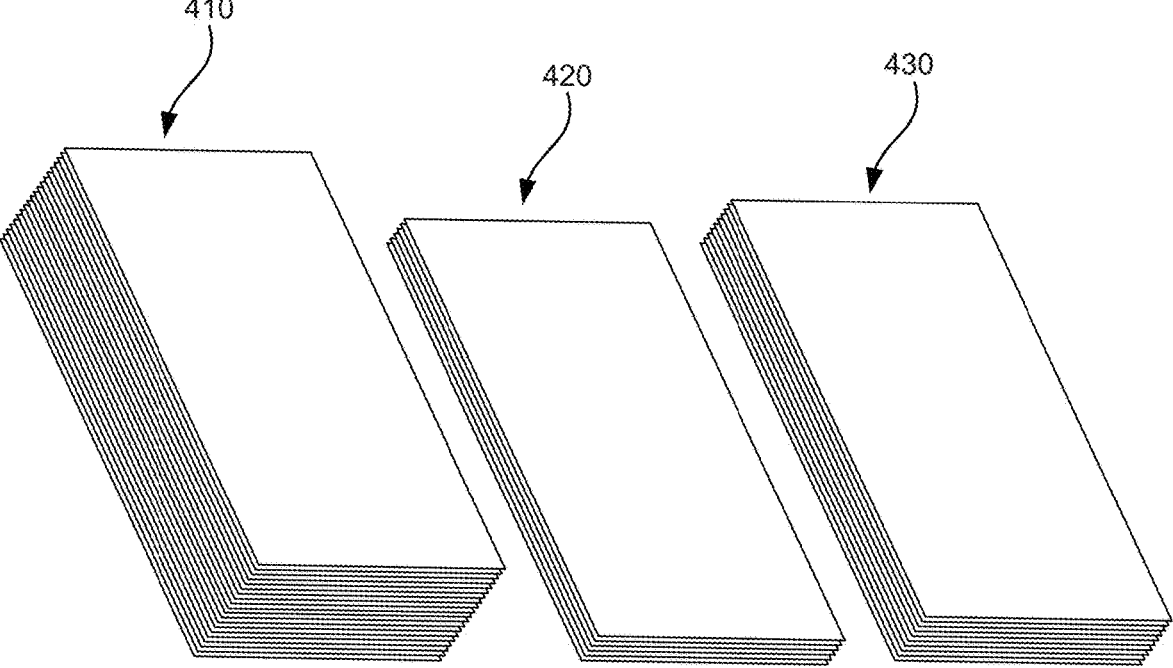
FIG. 4 illustrates various original decks of card for a game, in accordance with various examples.

In various examples, card deck 110 can comprise an original card deck having various card types. With additional reference to FIG. 4, a card deck for game system 100 can comprise one or more sub-decks of cards (each sub-deck may also be referred to as a "deck" herein). For example, a card deck 110 for game system 100 can comprise an action card deck 410, a main character deck 420, and/or an upgraded main character deck 430. Cards in the original card deck can comprise any suitable shape (e.g., rectangular, square, oval, and/or the like) and any suitable material (e.g., the cards can be made of paper, cardboard, a polymeric material (e.g., a plastic), a ceramic, a metallic material, and/or the like).

In various examples, a main character deck 420 can comprise one or more main character cards. For example, main character deck 420 can comprise 1-10 main character cards, 2-7 main character cards, 4-6 main character cards, at least 3 main character cards, or about 3, 4, 5, or 6 main character cards (in this context, "about" means plus or minus two cards). Each main character card in main character deck 420 can comprise a character (e.g., a picture and/or title thereof) and/or various characteristics or statistics of the respective main character. For example, each main character can have a hit point value, attack value, defense value, and/or agility value associated with it, with numerical values representing each on the respective main character card.

Figure 5A:
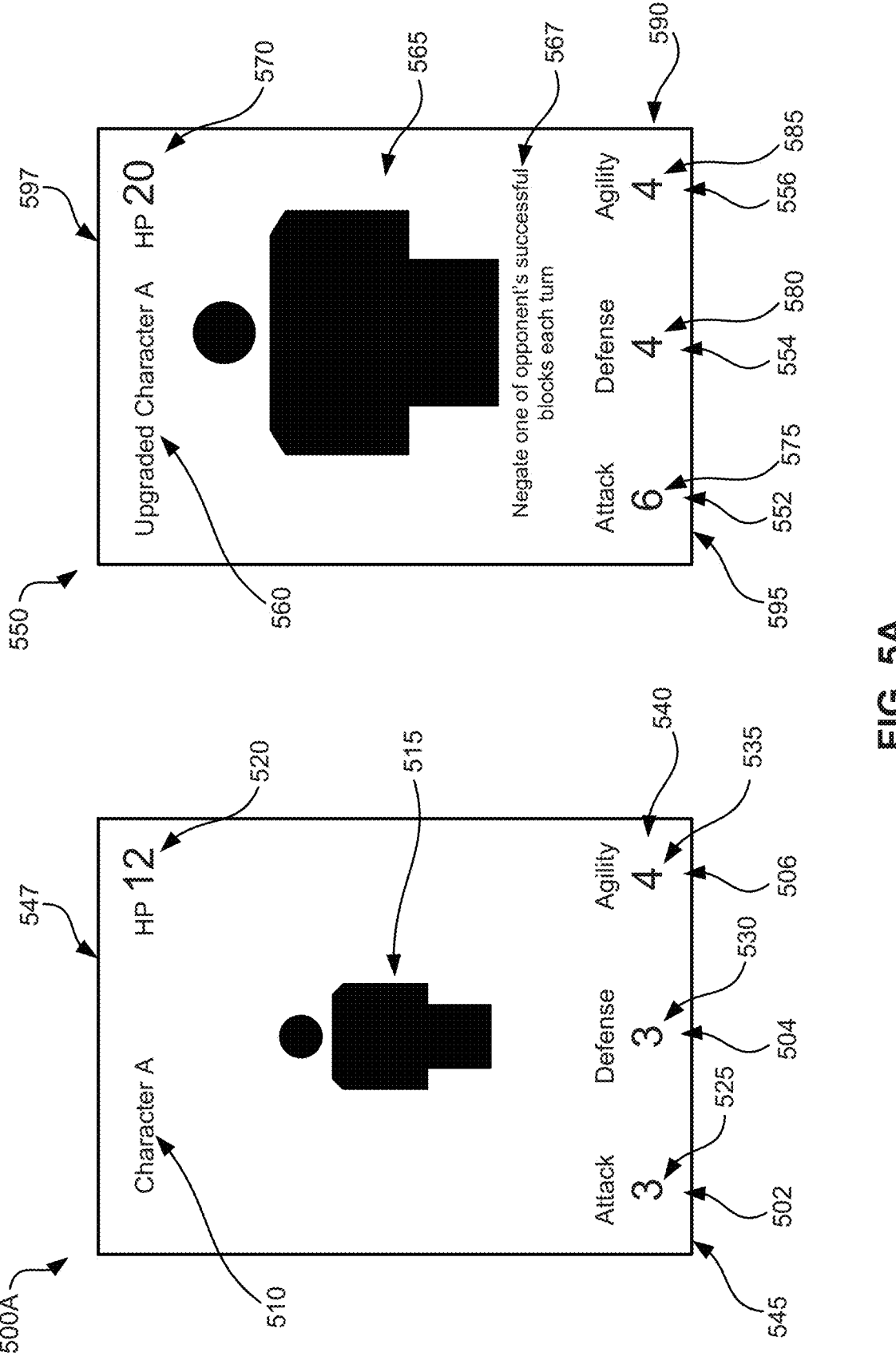
FIG. 5A illustrates an exemplary main character card and an exemplary upgraded main character card for inclusion in an original deck of cards for a game, in accordance with various examples.

With additional reference to FIG. 5A, main character card 500A is an example of a main character card included in main character deck 420. Main character card 500A can comprise the character title or name 510 and/or character image 515 to identify the associated character. Main character card 500A can comprise hit point value 520, wherein hit points are a unit of damage representing the amount of damage the associated main character can tolerate or withstand before being defeated. Main character card 500A can comprise attack value 525. The attack value can indicate the number of play selectors activated (e.g., the number of dice rolled) during battle phase in a game in response to the respective main character card being an attacking character. Main character card 500A can comprise defense value 530. The defense value can indicate the number of play selectors activated (e.g., the number of dice rolled) during a battle phase in response to the respective main character card being a defending character. Main character card 500A can comprise agility value 535. During a battle phase of a game, the agility values of two opposing main characters can be compared, the difference therebetween being an agility difference. The main character with the greater agility value can reactivate a number of value selectors (e.g., reroll a number of dice) equal to the agility difference to try to obtain a better result to the battle phase than obtained only from the attack value and defense value.

The statistics, properties, or other information of a main character can be disposed in any suitable location on the main character card. As shown on main character card 500A, character name 510 and/or hit point value 520 can be disposed proximate and/or adjacent to top edge 547. Attack value 525, defense value 530, and agility value 535 can be disposed in a value or statistics section 540, which can be disposed along and/or proximate a bottom edge 545 of main character card 500A. A statistics section on a main character card can have various positions for different values or statistics. For example, main character card 500A can comprise first value position 502, second value position 504, and/or third value position 506. Attack value 525 can be disposed in first value position 502, defense value 530 can be disposed in second value section position 504, and agility value 535 can be disposed in second value third position 506. In various examples, the total of adding up the attack, defense, and agility values for a main character may not exceed a threshold character value (e.g., 10). Accordingly, the sum of the attack, defense, and agility values for a main character can be less than or equal to the threshold character value.

In various examples, an upgraded main character deck 430 can comprise one or more upgraded main character cards. Each upgraded main character card in upgraded main character deck 430 can be associated with a main character card in main character deck 420. Accordingly, the number of upgraded main character cards in upgraded main character deck 430 can be less than or equal to the number of main character cards in main character deck 420. In various examples, the number of upgraded main character cards in upgraded main character deck 430 can be greater than the number of main character cards in main character deck 420. For example, there may be multiple levels of main character upgrades, such than one upgraded main character card can be an upgrade from another upgraded main character card, which can be the first upgrade from the associated main character card. Each upgraded main character card in upgraded main character deck 430 can comprise an upgraded character (e.g., a picture and/or title thereof) and/or various characteristics or statistics of the respective upgraded main character. For example, each upgraded main character can have an upgraded hit point value, upgraded attack value, upgraded defense value, and/or upgraded agility value associated with it, each of which can be greater than the respective value for the associated main character (i.e. the upgraded hit point value that is greater than the hit point value, the upgraded attack value that is greater than the attack value, the upgraded defense value that is greater than the defense value, and/or the upgraded agility value that is greater than the agility value).

As shown in FIG. 5A, upgraded main character card 550 is an example of an upgraded main character card included in upgraded main character deck 430. Upgraded main character card 550 can comprise the upgraded character title or name 560 and/or upgraded character image 565 to identify the associated upgraded character. Upgraded main character card 550 can comprise upgraded hit point value 570, upgraded attack value 575, upgraded defense value 580, and/or upgraded agility value 585. During a battle phase of a game utilizing gaming system 100, the upgraded statistics of an upgraded character can be used in place of the main character statistics. In various examples, an upgraded main character can have an ability or action that occurs during the respective player's turn. The upgraded main character's ability, for example, can affect its or the opponent's (e.g., the opposing main character's) attack value or damage given, its defense value or damage received, its agility value, its hit points, the number of attack dice rolled during the main character's attack, the number of defense dice rolled during the main character's defense, the number of attack or defense dice rerolled based on the agility value, and/or any other desired action. The upgraded main character's ability can be disposed above upgraded value section 590 (e.g., between upgraded value section 590 and upgraded character image 565). For example, upgraded main character card 550 can comprise ability 567, which negates one of opponent's successful blocks each turn.

The statistics or other information of an upgraded main character can be disposed in any suitable location on the upgraded main character card. As shown on upgraded main character card 550, upgraded character name 560 and/or upgraded hit point value 570 can be disposed proximate and/or adjacent to top edge 597. Upgraded attack value 575, upgraded defense value 580, and upgraded agility value 585 can be disposed in an upgraded value or statistics section

590, which can be disposed along and/or proximate a bottom edge 595 of upgraded main character card 550. An upgraded section on an upgraded main character card can have various positions for different upgraded values or statistics. For example, upgraded main character card 550 can comprise first upgraded value section position 552, second upgraded value section position 554, and/or third upgraded value section position 556. Upgraded attack value 575 can be disposed in first upgraded value section position 552, upgraded defense value 580 can be disposed in second upgraded value section position 554, and upgraded agility value 585 can be disposed in second upgraded value third position 556. Accordingly, the position on an upgraded main character card of upgraded statistics can correspond to and/or align with the position of the statistics for the associated main character card. In various examples, the total of adding up the upgraded attack, defense, and agility values for an upgraded main character may not exceed an upgraded threshold character value (e.g., 15). Accordingly, the sum of the upgraded attack, defense, and agility values for an upgraded main character can be less than or equal to the upgraded threshold character value.

During gameplay, to upgrade a main character card to the associated upgraded main character card, the player can place the upgraded main character card over the associated upgraded main character card, and/or replace the main character card with the associated upgraded main character card. As used herein, "main character" can refer to the active character being played by a player, whether the active main character is a main character on a main character card or an upgraded main character on an upgraded main character card.

In various examples, action card deck 410 can comprise action cards that instruct certain actions or cause effects in response to a card being activated or played during gameplay of game system 100. In various examples, action card deck 410 can comprise 30-70 cards, 40-60 cards, about 30 cards, about 40 cards, about 50 cards, or about 60 cards (in this context, "about" means plus or minus five cards). Action card deck 410 can comprise various types of action cards. In various examples, an action card can comprise a training card, an equipment card, a single use card, a permanent card, an instant card, and/or an upgrade card. In various examples, action card deck 410 can comprise at least one training card, at least one equipment card, at least one single use card, at least one permanent card, at least one instant card, and/or at least one upgrade card (i.e., action card deck 410 can comprise any number and/or combination of such action card types).

A training card can be played during gameplay of game system 100. The training card can be associated with a main character (a main character card or upgraded main character card). In response to being played, a training card can increase at least one statistic for a main character (e.g., increase at least one of the hit point value, attack value, defense value, or agility value of a main character). In various examples, a training card can also increase a level of a main character (e.g., by indicating the level increase on the training card, or by increasing the main character level by one for each training card associated with the main character).

Figure 6B:
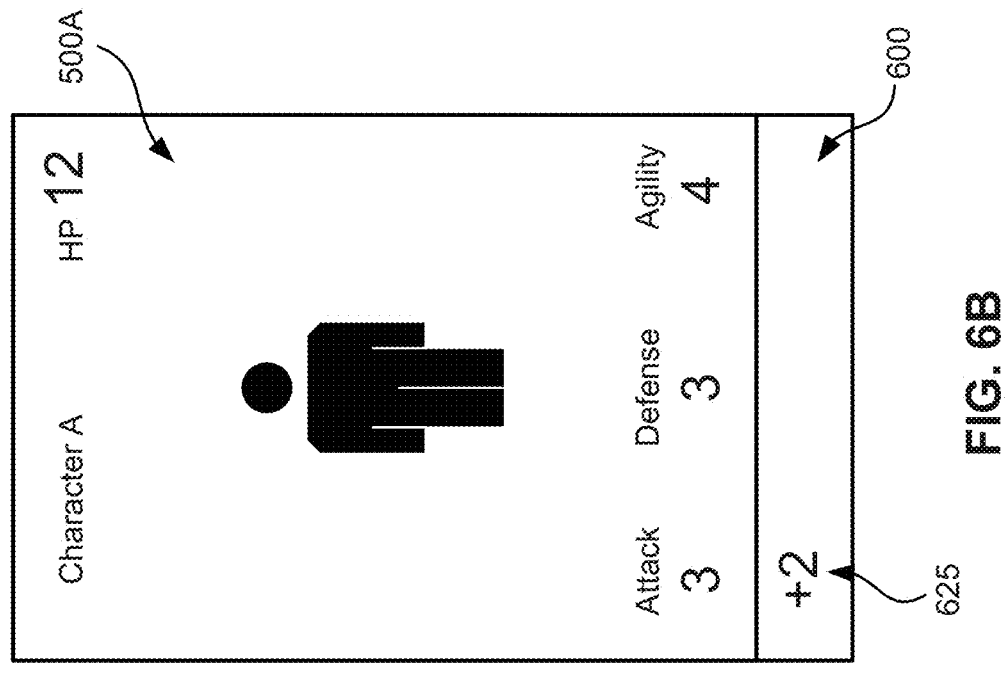
FIG. 6B illustrates the training card of FIG. 6A applied to the main character card of FIG. 5A for a game, in accordance with various examples.
Figure 6A:
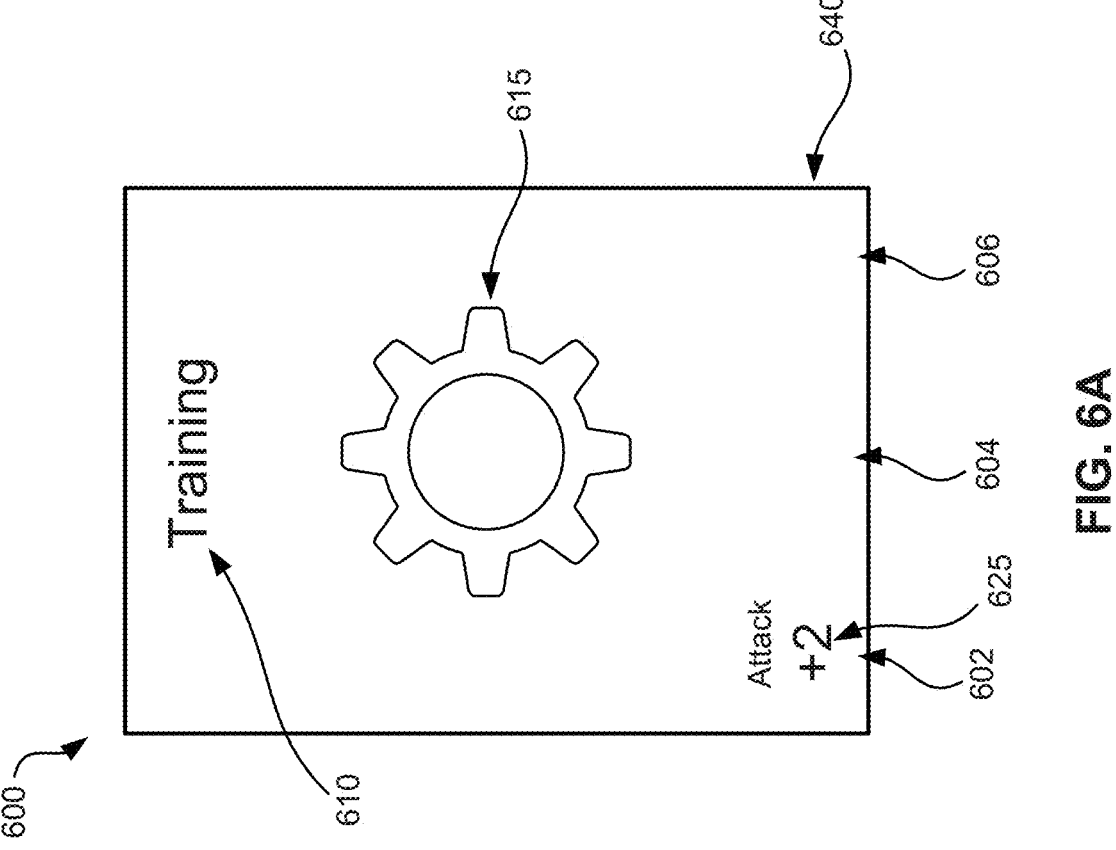
FIG. 6A illustrates an exemplary training card for inclusion in an original deck of cards for a game, in accordance with various examples.

With additional reference to FIG. 6A, a training card 600 is illustrated, in accordance with various examples. Training card 600 can comprise a training title or name 610, training image or symbol 615, and/or a statistic increase. The statistic increase can be disposed in a value increase section 640 of training card 600, which can be disposed proximate and/or adjacent to a bottom edge of training card 600. Value increase section 640 of training card 600 can be disposed in the same or similar position as the position of value section 540 of main character card. Similar to value section 540 of main character card 500A having first value position 502, second value position 504, and/or third value position 506, value increase section 640 of training card 600 can comprise first value increase position 602, second value increase position 604, and/or third value increase position 606 disposed in the same or similar positions along value increase section 640. In various examples, an attack value increase of a training card can be disposed in the same position along the value increase section of the training card as the position in which the attack value is disposed along the value section of the main character card, a defense value increase of a training card can be disposed in the same position along the value increase section of the training card as the position in which the defense value is disposed along the value section of the main character card, and an agility value increase of a training card can be disposed in the same position along the value increase section of the training card as the position in which the agility value is disposed along the value section of the main character card. For example, an attack value increase 625 can be disposed in first value increase position 602, a defense value increase can be disposed in second value increase position 604, and/or an agility value increase can be disposed in third value increase position 606. In various examples, a hit point increase on a training card can be disposed in the same or similar position as the hit point value is disposed on the main character card (e.g., in a top right or top left position proximate and/or adjacent to the top edge of the respective card).

In response to being played, a training card can be disposed on, under, or near the associated main character card to indicate the effect the training card has on the main character. In various examples, with additional reference to FIG. 6B, training card 600 can be disposed under main character card 500A, with value increase section 640 staggered from value section 540 of main character card 500A and/or exposed from under main character card 500A. That is, the training card bottom edge can be protruding below the main character card bottom edge. Thus, the value increase provided by training card 600 can be visible and aligned with the respective value of main character card 500A. For example, attack value increase 625 of training card 600 is aligned with attack value 525 of main character card 500A. With such position of a training card and main character card relative to one another, the first, second, and third value positions of the value section of the main character card can be aligned with the first, second, and third value increase positions of the value increase section of the training card, allowing a player to easily reference the effect of a training card on a main character. For example, training card 600 increases the attached value of main character card 500A by two ("+2"). Additional training cards affecting the statistic values of the main character can similarly be disposed under the bottom-most card, with the value increase section of the respective training card being staggered and protruding out from the bottom edge of the training card above, creating a main character card with a staggered or stairstep training card stack thereunder.

In response to a training card increasing the hit points of a main character, the training card can be disposed under the main character card with the top edge of the training card being staggered from and/or protruding above the top edge of the main character card such that the hit point value and the hit point value increase can be aligned.

In various examples, the number of training cards associated with a main character can indicate the level of the main character. For example, a main character's level can increase with each training card associated therewith (e.g., increasing by 1 level for each training card). As shown in FIG. 6B, main character card 500A can have a level value of 1, because one training card 600 is associated therewith. In various examples, there can be a training limit of the number of training cards a player can associate with a main character, for example about five, four, or three training cards (in this context, "about" means plus or minus two cards). Various action cards can have a level requirement, which the main character must attain before such action cards can be played.

In various examples, an equipment card can be played during gameplay of game system 100. The equipment card can be associated with a main character (a main character card or upgraded main character card). In response to being played, an equipment card can be associated with the respective main character until the end of a turn or round, until the associated main character is defeated, and/or until the equipment card is exhausted (i.e., its effect has been fully used up) or discarded. An equipment card can have an effect on a player or opponent's main character, such as its attack value or damage given, its defense value or damage received, its agility value, its hit points, the number of attack dice rolled during the main character's attack, the number of defense dice rolled during the main character's defense, the number of attack or defense dice rerolled based on the agility value, provide an ability to effect any of the foregoing, and/or any other desired action, and/or have an effect on the player or the player's turn (or the opponent or the opponent's turn), such as the number of cards in the player or opponent's hand (e.g., instructing drawing or discarding a certain number of cards), removing opponent action cards (e.g., equipment or training cards), and/or the like. Such an effect can take place with any suitable frequency (e.g., once per turn, once per turn phase, and/or the like).

In various examples, when played, an equipment card can be disposed on the game surface proximate and/or adjacent to the associated main character. There may be no other cards in between a main character card and an associated equipment card. In various examples, there can be an equipment limit of the number of equipment cards a player can associate with a main character, for example about five, four, three, or two equipment cards (in this context, "about" means plus or minus one or two cards). If a player has played a number of equipment cards equal to the equipment limit (e.g., three), the player can discard one of the played equipment cards in order to play and associate another equipment card with the main character.

Figures 7, 8:
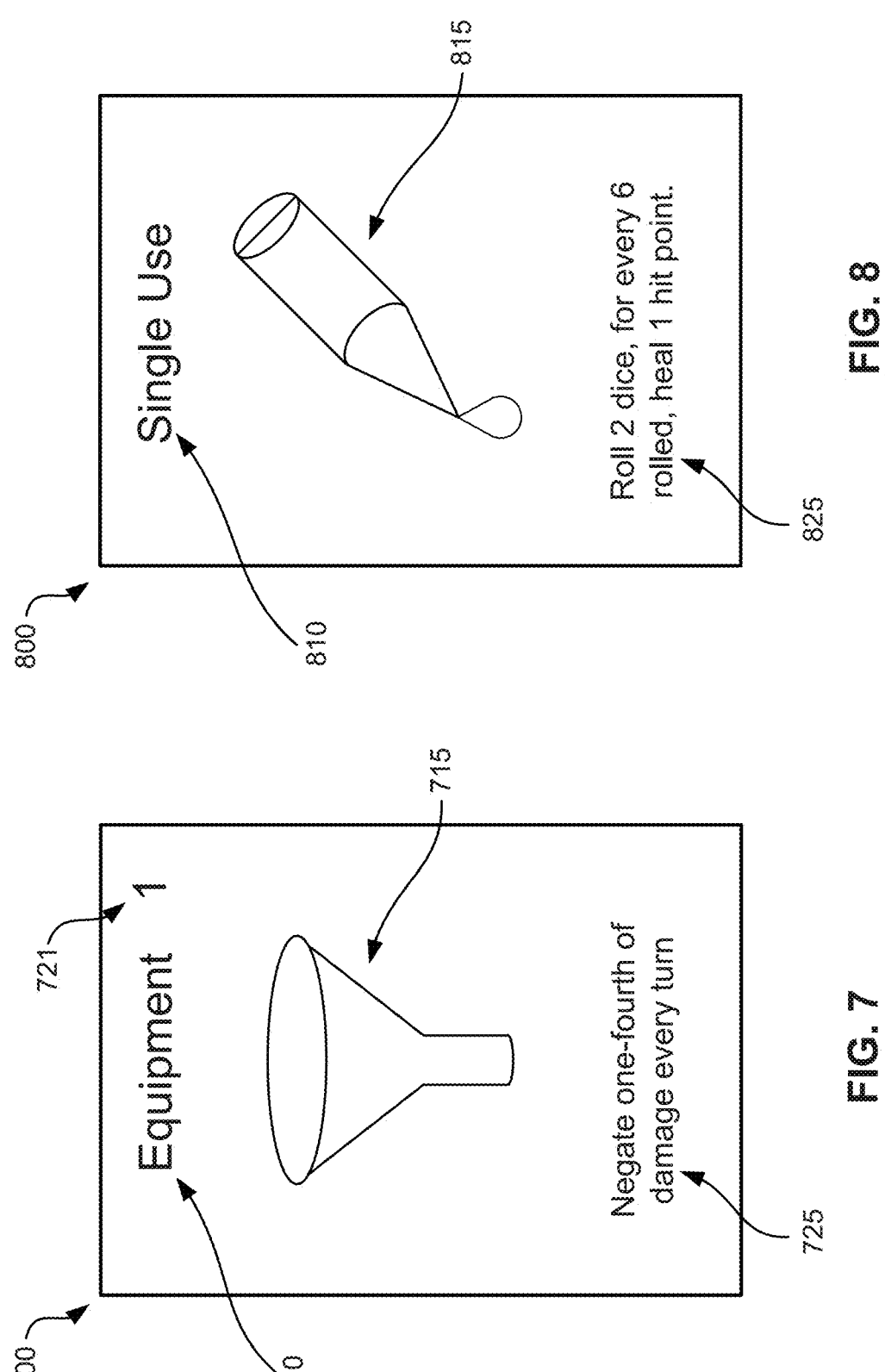
FIG. 7 illustrates an exemplary equipment card for inclusion in an original deck of cards for a game, in accordance with various examples.
FIG. 8 illustrates an exemplary single use card for inclusion in an original deck of cards for a game, in accordance with various examples.

With additional reference to FIG. 7, an equipment card 700 is illustrated, in accordance with various examples. Equipment card 700 can comprise an equipment title or name 710, equipment image or symbol 715, a level requirement 721, and/or an equipment effect 725. Equipment title 710 can be disposed proximate and/or adjacent to a top edge of equipment card 700. Level requirement 721 can be disposed on either side of, and/or above or below, equipment title 710. In various examples, there may be no other components of equipment card 700 disposed between equipment title 710 and level requirement 721. Level requirement 721 can indicate the minimum level of a main character required to use the respective equipment card. For example, equipment card 700 has a level requirement 721 of 1. Accordingly, only main characters having a level of at least 1 (e.g., having at least one training card associated with the main character) can utilize equipment effect 725. As discussed, the equipment effect of an equipment card can be any suitable effect or action, such as equipment effect 725 of negating one-fourth of damage to the associated main character every turn. The equipment effect can be disposed proximate or adjacent to a bottom edge of the equipment card. Equipment symbol 715 can be disposed between equipment title 710 and equipment effect 725.

In various examples, a single use card can be played during gameplay of game system 100. In response to being played, a single use card can have an effect, and in response to enacting such effect, the single use card can be discarded. A single use card may not remain in play having a continual or reoccurring effect. The actions and/or effects instructed by a played single use card can take place at the time of playing the single use card (e.g., immediately and/or without any other actions in the game occurring). In various examples, the effect of a single use card can depend on random results from value selectors (e.g., the rolling of dice). A single use card can require the rolling of one or more dice, and based on the values resulting from the dice roll, an effect can occur. For example, with additional reference to FIG. 8, effect 825 of single use card 800 requires the rolling of two dice, and for every 6 (the value) rolled, the player's main character heals 1 hit point. A single use card can have an effect on a player or opponent's main character, such its attack value or damage given, its defense value or damage received, its agility value, its hit points, the number of attack dice rolled during the main character's attack, the number of defense dice rolled during the main character's defense, and/or the number of attack or defense dice rerolled based on the agility value, and/or any other desired action, and/or have an effect on the player or the player's turn (or the opponent or the opponent's turn), such as the number of cards in a player's hand (e.g., instructing drawing or discarding a certain number of cards), removing opponent action cards (e.g., equipment or training cards), and/or the like.

With additional reference to FIG. 8, single use card 800 is illustrated, in accordance with various examples. Single use card 800 can comprise a single use title or name 810, single use symbol 815, and/or a single use action or effect 825. Single use title 810 can be disposed proximate and/or adjacent to a top edge of single use card 800. In various examples, a single use card can comprise a level requirement, similar to equipment level requirement 721 discussed in relation to equipment card 700. As discussed, the single use effect of a single use card can be any suitable effect or action, such as single use effect 825, discussed herein. The single use effect can be disposed proximate or adjacent to a bottom edge of the single use card. Single use symbol 815 can be disposed between single use title 810 and single use effect 825.

In various examples, an instant card can be played during gameplay of game system 100. An instant card can be a type of a single use card. In response to being played, an instant card can have an effect. In various examples, an instant card can be played at any phase or stage of a player's turn, and is not limited to a certain phase (whereas other cards, such as equipment cards, single use cards, permanent cards, and/or upgrade cards can only be played during a certain phase of a player's turn, such as a preparation phase, as discussed further herein). In various examples, an instant card can be played at a phase of a player's turn that is specified on the respective instant card. In various examples, there can be a played card limit for a player's turn, which dictates the maximum number of cards (e.g., cards of a certain type, such as action cards) that can be played. Instant cards may not count toward the played card limit for a player during a turn. In various examples, an instant card can be required to be played in response to another card being played (by the same player or the opponent). For example, if an instant card requires that it be played in response to an opponent's played card, the instant card can be played in response to the required card being played by the opponent (e.g., instantly or during the player's turn). In response to playing an instant card and enacting the respective effect, the instant card can be discarded. An instant card may not remain in play having a continual or reoccurring effect. The actions and/or effects instructed by a played instant card can take place at the time of playing the single use card (e.g., immediately and/or without any other actions in the game occurring).

An instant card can have an effect on a player or opponent's main character, such its attack value or damage given, its defense value or damage received, its agility value, its hit points, the number of attack dice rolled during the main character's attack, the number of defense dice rolled during the main character's defense, the number of attack or defense dice rerolled based on the agility value, and/or any other desired action, and/or have an effect on the player or the player's turn (or the opponent or the opponent's turn), such as the number of cards in a player's hand (e.g., instructing drawing or discarding a certain number of cards), removing opponent action cards (e.g., equipment or training cards), and/or the like.

Figure 9:
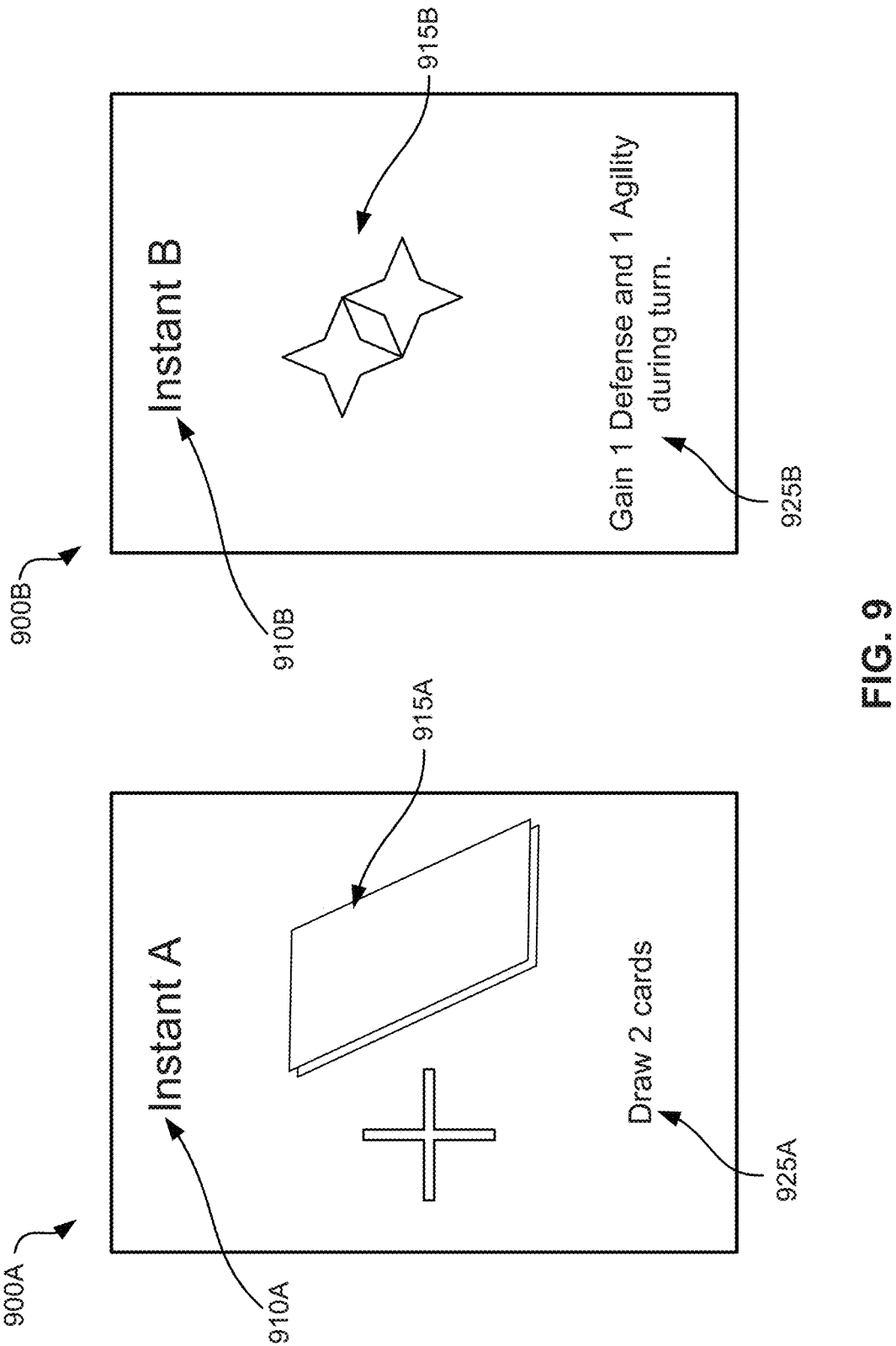
FIG. 9 illustrates exemplary instant action cards for inclusion in an original deck of cards for a game, in accordance with various examples.

With additional reference to FIG. 9, instant cards 900A and 900B are illustrated, in accordance with various examples. Instant cards 900A,B can comprise instant titles or names 910A,B, instant symbols 915A,B, and/or instant actions or effects 925A,B. The instant title can be disposed proximate and/or adjacent to a top edge of an instant card. In various examples, an instant card can comprise a level requirement, similar to equipment level requirement 721 discussed in relation to equipment card 700. As discussed, the instant effect of an instant card can be any suitable effect or action. For example, instant card 900A has an instant effect 925A of the player who played instant card 925A to draw two cards (e.g., action cards), which can occur immediately. As another example, instant card 900B has an instant effect 925B of the player who played instant card 925B to gain one defense and one agility during the turn in which instant card 925B is played (thus, the main character's defense value and agility value will each increase by one for the respective turn). The instant effect can be disposed proximate or adjacent to a bottom edge of the instant card. The instant symbol can be disposed between the instant title and the instant effect.

In various examples, a permanent card can be played during gameplay of game system 100. In response to being played, a permanent card can have an effect. A permanent card can remain active until the end of a round of the game (e.g., until one of the player's main character is defeated). Accordingly, the permanent card effect can remain active until the end of the respective round (e.g., the effect can be continual or reoccurring). The actions and/or effects instructed by a played or active permanent card can take place at the time of playing the permanent card (e.g., immediately and/or without any other actions in the game occurring), and/or at a certain phase of each turn of a round. In various examples, the effect of a permanent card can depend on random results from value selectors (e.g., the rolling of dice), similar to the discussion with regard to single use cards. For example, a permanent card can require a player to roll a die each turn to determine the effect or whether the effect occurs that turn. A permanent card can have an effect on a player or opponent's main character, such its attack value or damage given, its defense value or damage received, its agility value, its hit points, the number of attack dice rolled during the main character's attack, the number of defense dice rolled during the main character's defense, the number of attack or defense dice rerolled based on the agility value, and/or any other desired action, and/or have an effect on the player or the player's turn (or the opponent or the opponent's turn), such as the number of cards in a player's hand (e.g., instructing drawing or discarding a certain number of cards), removing opponent action cards (e.g., equipment or training cards), and/or the like. Again, such an effect can take place with any suitable frequency (e.g., once per turn, once per turn phase, and/or the like).

In various examples, there can be a permanent card limit of the number of permanent cards a player can play per round, for example one, two, or three permanent cards. If a player has played a number of permanent cards equal to the permanent card limit (e.g., one), the player can discard one active permanent card in order to play another permanent card.

Figures 10, 11:
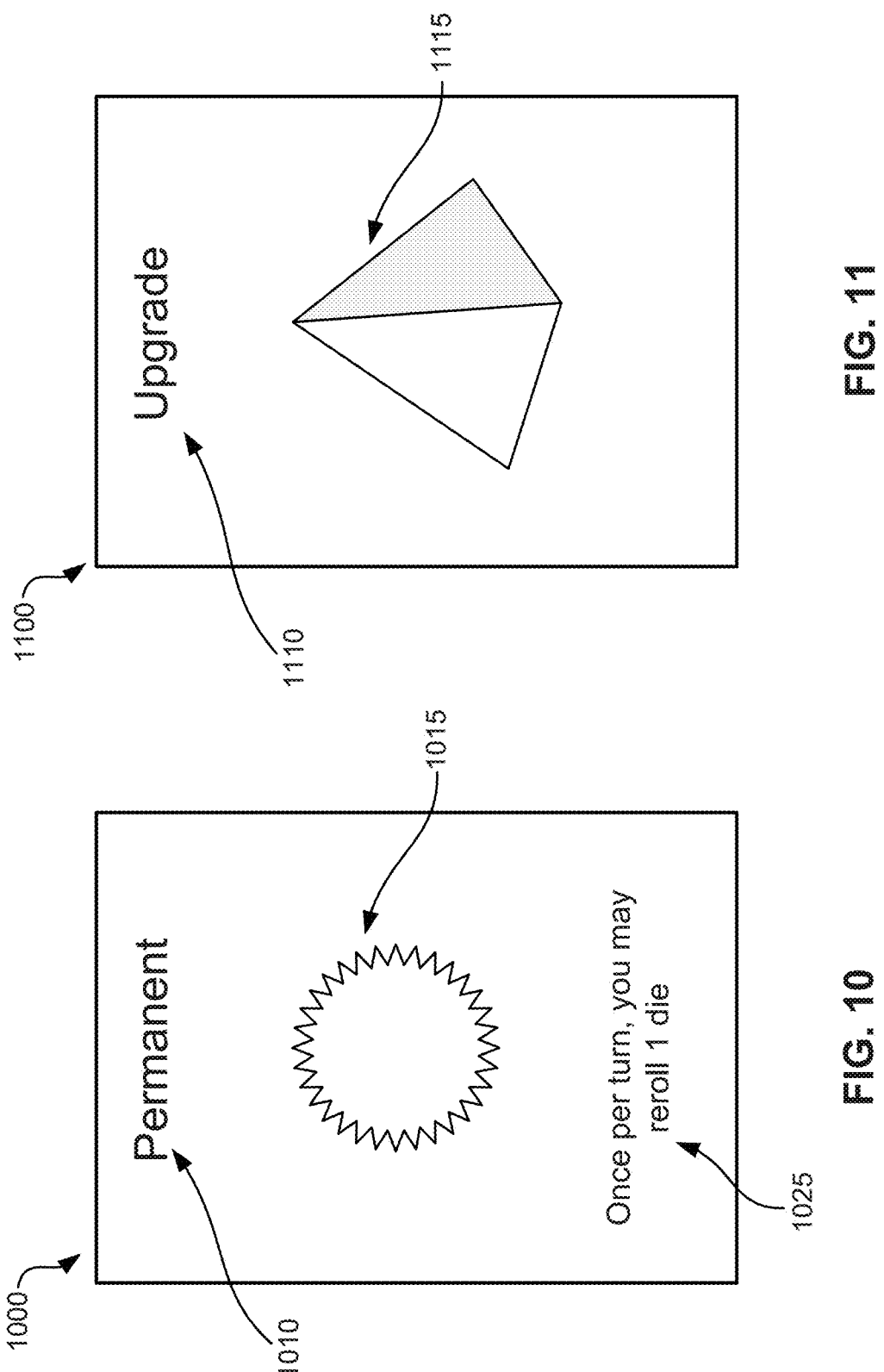
FIG. 10 illustrates an exemplary permanent card for inclusion in an original deck of cards for a game, in accordance with various examples.
FIG. 11 illustrates an exemplary upgrade card for inclusion in an original deck of cards for a game, in accordance with various examples.

With additional reference to FIG. 10, permanent card 1000 is illustrated, in accordance with various examples. Permanent card 1000 can comprise a permanent title or name 1010, permanent symbol 1015, and/or a permanent action or effect 1025. Permanent title 1000 can be disposed proximate and/or adjacent to a top edge of permanent card 1000. In various examples, a permanent card can comprise a level requirement, similar to equipment level requirement 721 discussed in relation to equipment card 700. As discussed, the permanent effect of a single use card can be any suitable effect or action, such as permanent effect 1025, which allows a player to reroll one die per turn. That is, if it is the player's turn to attack, the player can reroll an attack die to try and give more damage to the opponent's main character, and if it is the opponent's turn to defend, the player can reroll a defense die to try and block more damage coming from the opponent's main character. The permanent effect can be disposed proximate or adjacent to a bottom edge of the permanent card. Permanent symbol 1015 can be disposed between permanent title 1010 and permanent effect 1025.

In various examples, an upgrade card can be played during gameplay of game system 100. In response to being played, an upgrade card can cause the main character to upgrade to an upgraded main character, as discussed herein. For example, if a player is using main character card 500A shown in FIG. 5A (i.e., main character card 500A is active), in response to playing an upgrade card, main character card 500A can be upgraded to upgraded main character card 505. Thus, in response to playing an upgraded card, the player can find the upgraded main character card from the upgraded main character deck that is associated with the active main character card. The associated upgraded main character card can replace the associated main character card, and the player gets the benefits of the upgraded statistic values of the upgraded main character card. In various examples, there can be an upgrade card associated with a main character card, such that the associated upgrade card is required to upgrade the main character card (and not other upgrade cards that may be associated with other main character cards).

With additional reference to FIG. 11, upgrade card 1100 is illustrated, in accordance with various examples. Upgrade card 1100 can comprise an upgrade title or name 1110 and/or a permanent symbol 1115. Upgrade title 1100 can be disposed proximate and/or adjacent to a top edge of upgrade card 1100. In various examples, an upgrade card can comprise a level requirement, similar to equipment level requirement 721 discussed in relation to equipment card 700. Upgrade symbol 1115 can be disposed between upgrade title 1110 and the bottom edge of upgrade card 1100. Upgrade title 1110 and/or upgrade system 1115 may indicate what main character card is associated with upgrade card 1100, and thus, which main character card upgrade card 1100 can upgrade.

Figure 12:
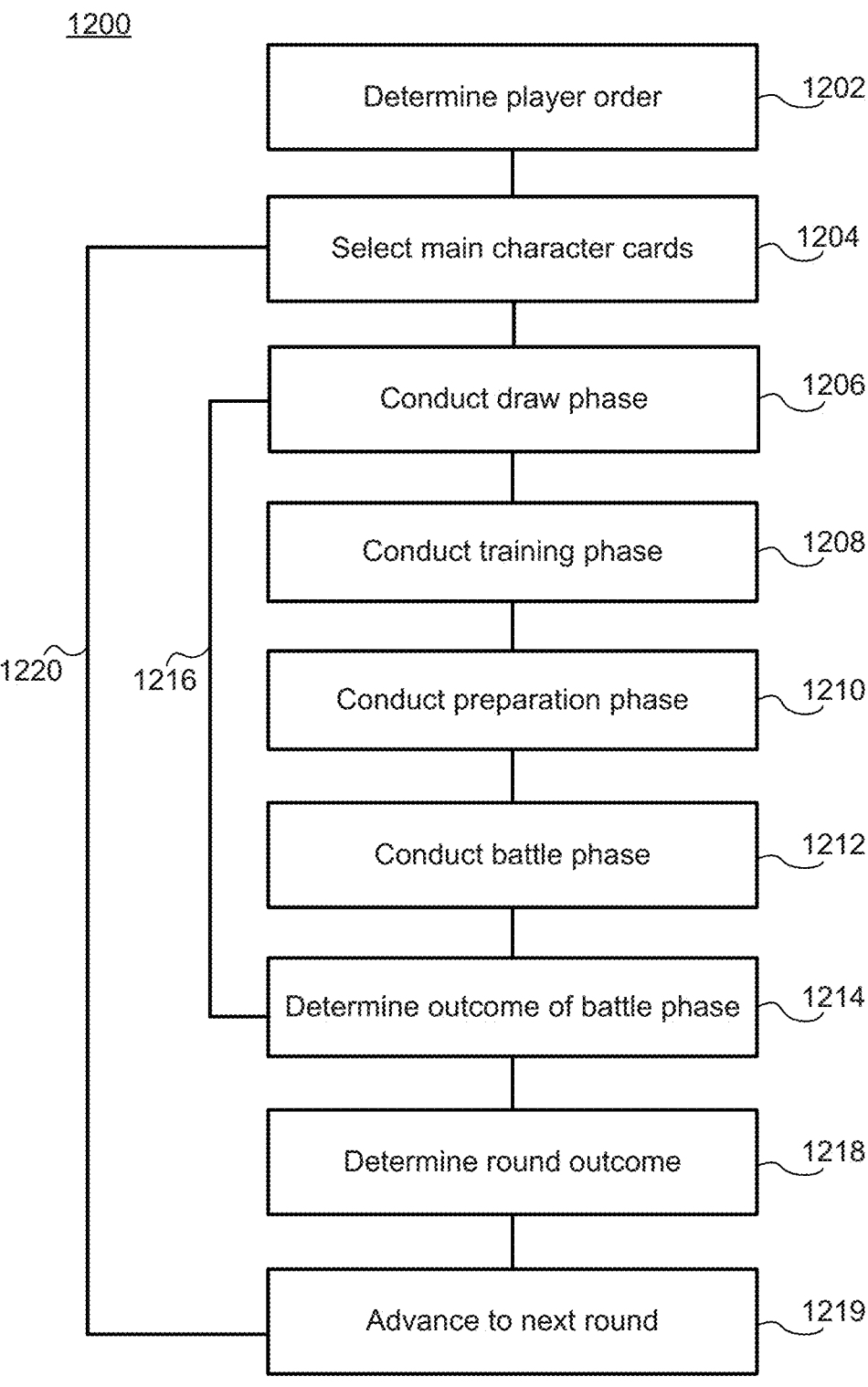
FIG. 12 illustrates a flowchart of an exemplary method for playing a game system, in accordance with various examples.

FIG. 12 illustrates a method 1200 for playing a game (e.g., using game system 100 and its components), in accordance with various examples. Game system 100 can be for two or more players. For example, a game can involve a first player and a second player, wherein the second player is (and may be referred herein to as) the opponent to the first player.

A game utilizing game system 100 can comprise different stages. As used herein, a player's "turn" refers to the respective player being able to take actions and/or attack the other player's main character. A player's turn can comprise multiple "phases" during which the player can take certain actions or play certain cards. Once the phases of a player's turn are complete, the game advances to allow the other player to have a similar turn. A "round" comprises multiple turns, and continues until the first or second player's main character is defeated (e.g., by reducing such main character's hit points to zero). A game can comprise one or more rounds. For example, a game can comprise three rounds, and the player to win two of the three rounds wins the game.

Figure 2:
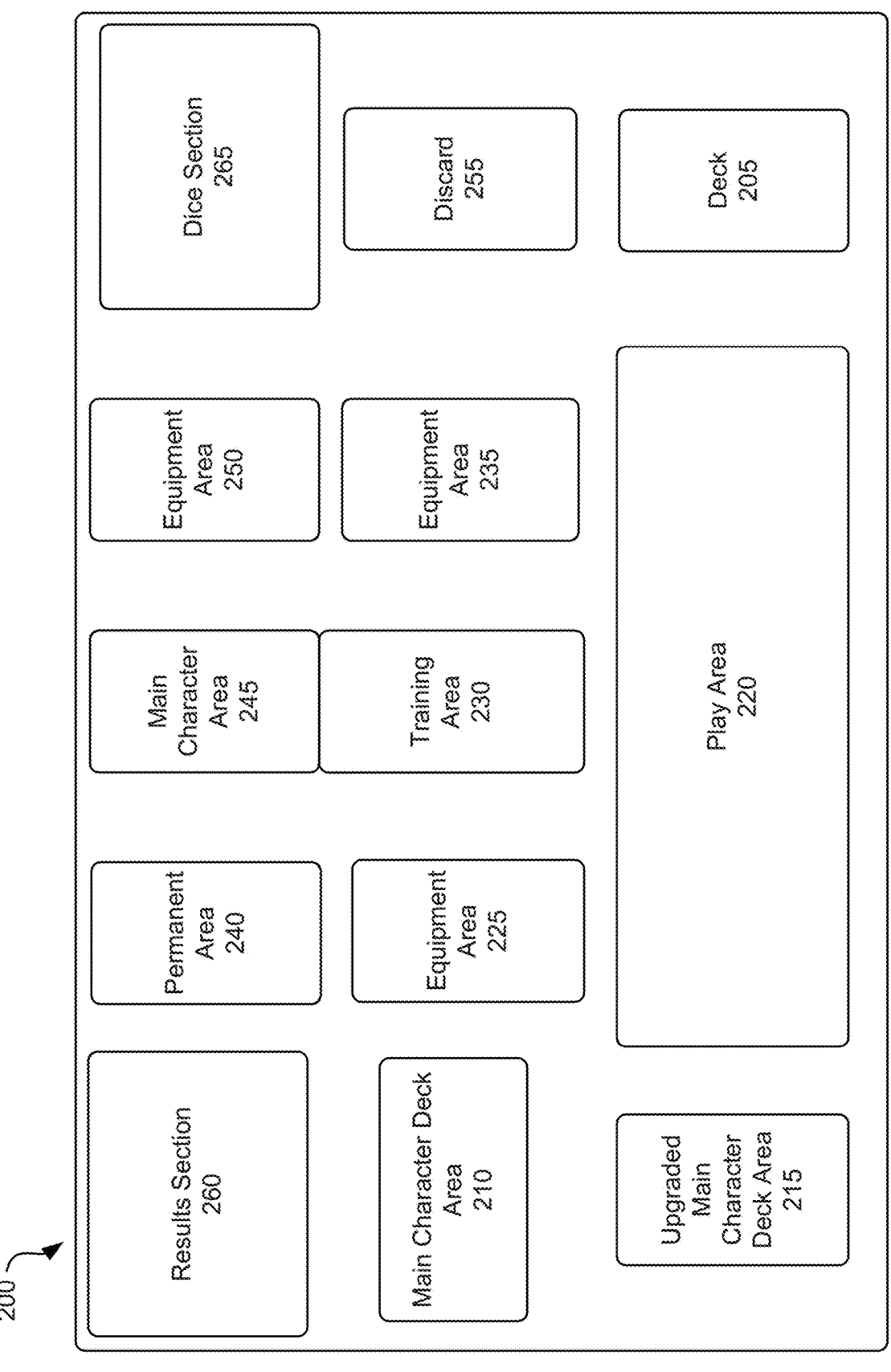
FIG. 2 illustrates a schematic diagram of a game surface for a game system, in accordance with various examples.

In various examples, to play the game of game system 100, each player can have a main character deck (e.g., comprising about five main character cards), an upgraded main character deck (e.g., comprising about five or ten upgraded main character cards), an action card deck (e.g., comprising about fifty action cards), and combat dice (e.g., five dice used for the respective main character attacking and defending during the game). With additional reference to FIG. 2, game system 100 can be played on a game surface (e.g., game surface 200). A game surface for game system 100 can comprise any suitable arrangement of areas or components for cards, dice, actions, and/or other aspects of the game. For example, the respective player utilizing game surface 200 can be positioned proximate or in play area 220. For example, a player can be positioned such that play area 220 is disposed between the player and the main character (e.g., main character 245). Cards can be played, dice can be rolled, and/or other actions can occur in play area 220.

The first player and the opponent can determine a player order (step 1202) (i.e., who gets to go first). This can occur randomly by, for example, flipping a coin, rolling dice to see who gets the highest or lowest value, and/or the like. The first player and opponent can each select their respective main character card from each of their main character decks (step 1204). The first player selects a player main character card and the opponent selects an opponent main character card. Such main character selection can occur randomly (e.g., drawing a main character card randomly from the respective main character deck), or each player can select a desired main character card. The player may select their main character cards without revealing the selection to the other character. In response to the first player and the opponent selecting their respective main character cards, the players can reveal the selected main character cards (e.g., simultaneously). The player main character card can be disposed in the main character area 245 of the respective player's game surface 200. Main character area 245 can be the portion closest to the center and closest to the other player's game surface, such that each player's main character are disposed opposite to one another (e.g., in a "head-to-head" arrangement). Each player's main character deck can be disposed in main character deck area 210, and each player's upgraded main character deck can be disposed in upgraded main character deck area 215.

Each player can shuffle their respective action card deck (e.g., action card deck 410 in FIG. 4) and place the action card deck facedown on game surface 200 (e.g., in deck portion 205) so the action cards in the action card deck are unknown to the respective player. "Facedown," as used herein, means the aspects or information on the respective card is hidden from the respective player. "Faceup," as used herein, means the aspects or information on the respective card is revealed to a respective player. Each turn can comprise multiple phases. For example, a player's turn can comprise a draw phase, a training phase, a preparation phase, and/or a battle phase. The player to have the first turn of the game and/or round may not be able to conduct a battle phase in order to allow the other player to have a draw, training, and/or preparation phase before defending an attack by the other player. In various examples, in a second round of a game, the player to go first does not skip the battle phase. For ease of explanation, method 1200 will be discussed as if the first player is conducting a turn other than the very first turn of a game (so a battle phase is not skipped).

To begin the game, each player can draw a number of action cards (e.g., about five, wherein in this context, "about" plus or minus two cards), which can be the player's hand or inventory. To begin a turn, the first player conducts a draw phase (step 1206). During a draw phase, the first player can draw one or more action cards from the first player's action card deck. In various examples, the first player draws one action card from the first player's action card deck during the draw phase (e.g., draws one card from the top of the facedown action card deck). In various examples, a player may have an active action card or play an action card that can affect the draw phase of a turn. For example, the player can have an active equipment card or permanent card that allows the player to draw two action cards during the draw phase of each of the player's turns.

In various examples, the first player can conduct a training phase (step 1208) of the first player's turn. The training phase can be in response to completion of the draw phase. During the training phase, the first player can play one or more training cards. As discussed herein, a training card can provide a statistic value increase, e.g., an increase in the attack value, defense value, agility, and/or hit points of the first player's active main character. In various examples, a training card can increase the level of the first player's active main character. For example, each training card played for a main character can increase the main character's level by 1. Active training cards played by the first player can be disposed under the main character card, as discussed herein in relation to FIGS. 6A and 6B, allowing easy reference of the statistic value increases. Thus, training cards can be disposed in training area 230 of game surface 200, below main character area 245 (i.e., with the statistic value changes of the training cards closer to play area 220 than main character area 245). So, a main character having two training cards protruding from underneath the main character card may have a level of 2, or if the main character has an original level number greater than zero, then the main character can have a level of the original level plus 2. In various examples, the first player can play a limited number of training cards, which is a maximum number of training cards able to be played during the training phase per turn (e.g., one training card). In various examples, if the first player does not have a training card in the first player's hand, or otherwise does not wish to play a training card, the first player can skip the training phase.

In various examples, the first player can play or have active at one time a training limit number of training cards, which is a maximum number of training cards that can be added or associated with a main character. For example, there can be a training limit of three, four, or five, six, or seven. The training limit for game system 100 can be five (e.g., the active main character can have a maximum level of 5). Accordingly, in response to the first player having five training cards active, the player may discard one of the active training cards to replace it with another training card.

Figure 13:
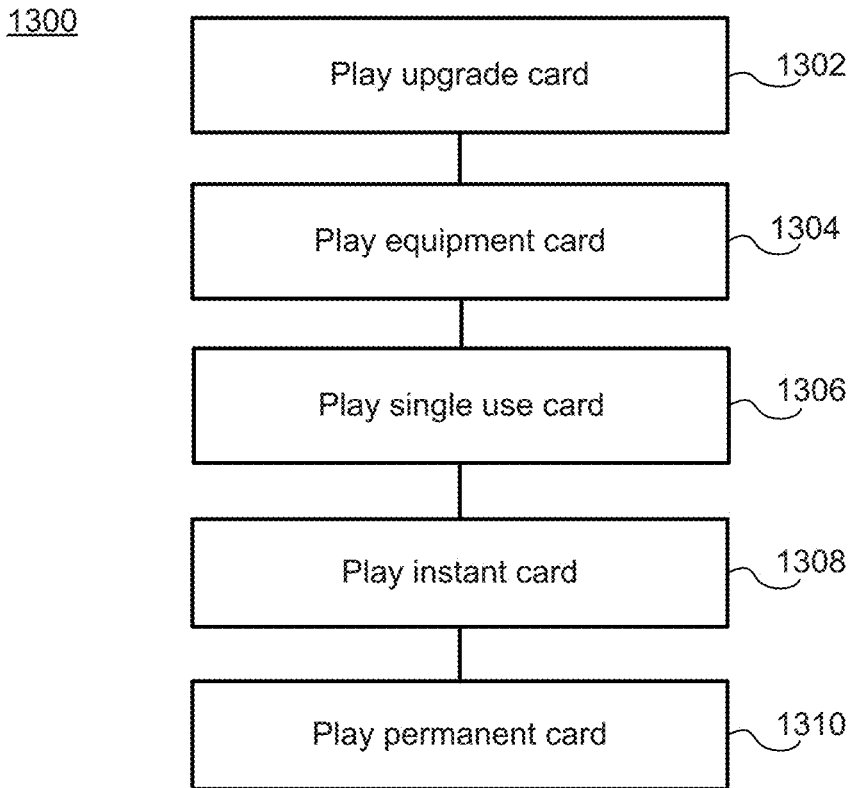
FIG. 13 illustrates a flowchart of an exemplary method for conducting a preparation phase during a game, in accordance with various examples.

In various examples, the first player can conduct a preparation phase (step 1210) of the first player's turn. The preparation phase can be in response to completion of the draw phase and/or training phase. With additional reference to FIG. 13 depicting a method 1300 for conducting a preparation phase during a game, during the preparation phase, the first player can play one or more action cards (other than training cards, so an upgrade card, equipment card, single use card, instant card, and/or permanent card). As discussed herein, there are various types of action cards that can have an effect on the first player's or opponent's main character, such as its attack value or damage given, its defense value or damage received, its agility value, its hit points, the number of attack dice rolled during its attack, the number of defense dice rolled during its defense, the number of attack or defense dice rerolled based on the agility value, provide an ability to effect any of the foregoing, and/or any other desired action, and/or can have an effect on the player or the player's turn (or the opponent or the opponent's turn). In various examples, each action card can have an indicator (e.g., in the name or title) that indicates which type of card each action card is, and such action cards can be played in accordance with the rules ascribed to or associated with each action card type. In various example, some types, and/or any or all types, of action cards can comprise a level requirement, such that the active main character must have reached a certain level in order to play such an action card.

During the preparation phase, the first player can play an upgrade card (e.g., upgrade card 1100 depicted in FIG. 11) (step 1302). The played upgrade card may be associated with the first player's active main character. In response to playing the upgrade card, the first player can find the upgraded main character card in the first player's upgraded main character deck that is associated with the active main character card. The upgraded main character card can be disposed over or replace the active main character card. Thus, the upgraded value statistics of the upgraded main character card (e.g., the upgraded attack, defense, agility, and/or hit point values) can be utilized by the first player until the end of the round.

During the preparation phase, the first player can play an equipment card (e.g., equipment card 700 depicted in FIG. 7) (step 1304). An equipment card can be activated (i.e., played), and remain active until exhausted or discarded (e.g., disposed in discard area 255), or until a round ends. An active equipment card can be disposed on game surface 200 proximate the active main character (e.g., in one of equipment areas 225, 235, 250 adjacent to main character area 245). In various examples, there may be no other aspect (e.g., card or area) between the main character area and the equipment areas on the game surface. Therefore, the first player can easily view the active equipment cards associated with the main character. An equipment card can have any desired effects dictated thereon, as discussed herein. The effect of an equipment card can occur periodically as dictated thereon for as long as the equipment card is active. For example, the effect 725 of equipment card 700 occurs every turn, so on each of the opponent's turns in which the opponent main character is going to deal damage to the first player main character, the effect 725 of equipment card 700 occurs (negating one-fourth of the opponent's damage dealt).

In various examples, an equipment card can have a level requirement, and therefore, can only be activated in response to the first player's main character having at least the required level. For example, equipment card 700 has a level requirement of 1. Therefore, the first player's main character must be at a level of at least 1 (e.g., the first player's main character must have at least one training card associated therewith) to activate equipment card 700 and/or cause the effect of equipment card 700 to occur. In various examples, an action card can be activated, but its effect may not occur until another turn after the first player's main character has achieved the requisite level for such action card.

In various examples, the first player can play or have active at one time an equipment limit number of equipment cards, which is a maximum number of equipment cards. For example, there can be an equipment limit of two, three, or four. The equipment limit for game system 100 can be three (e.g., one equipment card for each of equipment areas 225, 235, and 250 on game surface 200). Accordingly, in response to the first player having three equipment cards active, the player may discard one of the active equipment cards to replace it with another equipment card.

During the preparation phase, the first player can play a single use card (e.g., single use card 800 depicted in FIG. 8) (step 1306). A single use card can be activated (i.e., played), the action and/or effect from which can take place, and the single use card can be discarded. A single use card can have any desired effects dictated thereon, as discussed herein. In various examples, as discussed herein, the effect of a single use card can be dependent on a random outcome of a dice roll, for example, as discussed herein. For example, a single use card may provide a benefit to the first player in response to a certain value being rolled on dice. Such action and/or effect can occur in the preparation phase. In various examples, a single use card can have a level requirement, and therefore, can only be activated in response to the first player's main character having at least the required level.

During the preparation phase, the first player can play an instant card (e.g., one or more of instant cards 900A,B depicted in FIG. 9) (step 1308). An instant card can be activated (i.e., played), the action and/or effect from which can take place, and the instant card can be discarded. An instant card can have any desired effects dictated thereon, as discussed herein. An instant card may be played in any phase of the first player's turn, and may not be limited to the preparation phase. In various examples, an instant card can be played by the first player during the opponent's turn, for example, in response to the opponent playing a certain card or taking a certain action, the first player can play the instant card associated with the opponent's play. For example, an instant card can prevent an effect or action by the opponent during the opponent's turn. In various examples, an instant card can be required to be played in response to the first player playing a certain card, so the player would play two cards, including the instant card. In various examples, an instant card can have a level requirement, and therefore, can only be activated in response to the first player's main character having at least the required level.

During the preparation phase, the first player can play a permanent card (e.g., permanent cards 100 depicted in FIG. 10) (step 1310). A permanent card can be activated (i.e., played), and remain active until exhausted or discarded (e.g., disposed in discard area 255), or until a round ends. An active permanent card can be disposed on game surface 200 proximate the active main character (e.g., in permanent area 240 adjacent to main character area 245). In various examples, there may be no other aspect (e.g., card or area) between the main character area and the permanent area on the game surface. Therefore, the first player can easily view the active permanent card associated with the main character. A permanent card can have any desired effects dictated thereon, as discussed herein. The effect of a permanent card can occur periodically as dictated thereon for as long as the permanent card is active. For example, the effect of permanent card 1000 occurs on each of the first player's and opponents turns, so for example, the first player can reroll an attack die during the battle phase of the first player's turn, and the first player can reroll a defense die during the battle phase of the opponent's turn. In various examples, a permanent card can have a level requirement, and therefore, can only be activated in response to the first player's main character having at least the required level.

In various examples, the first player can play or have active at one time a permanent limit number of permanent cards, which is a maximum number of active permanent cards. For example, there can be a permanent limit of one, two, or three. The permanent limit for game system 100 can be one (e.g., one permanent card for permanent area 240 on game surface 200). Accordingly, in response to the first player having one permanent card active, the player may discard the active permanent card to replace it with another permanent card.

In various examples, if the first player does not have an action card (other than a training card) in the first player's hand, or otherwise does not wish to play an action card, the first player can skip the preparation phase.

In various example, a game can comprise an action card limit per turn. For example, a player can be limited to playing one, or two, or three action cards from the player's hand per turn. In various examples, the playing of an instant card may not count toward the maximum number of action cards allowed to be played during a player's turn or preparation phase.

In various examples, the effect of an action card can take place at any suitable time during a player's turn. For example, the effect of a training card can take place during the training phase, and the effect of an instant card or single use card can occur during the preparation phase (e.g., immediately after playing the respective card). The effects of some action cards, such as action cards related to attacking or defending during a battle phase of a turn (e.g., equipment card 700, single use card 800, permanent card 1000), can occur during the battle phase of a turn.

Figure 5B:
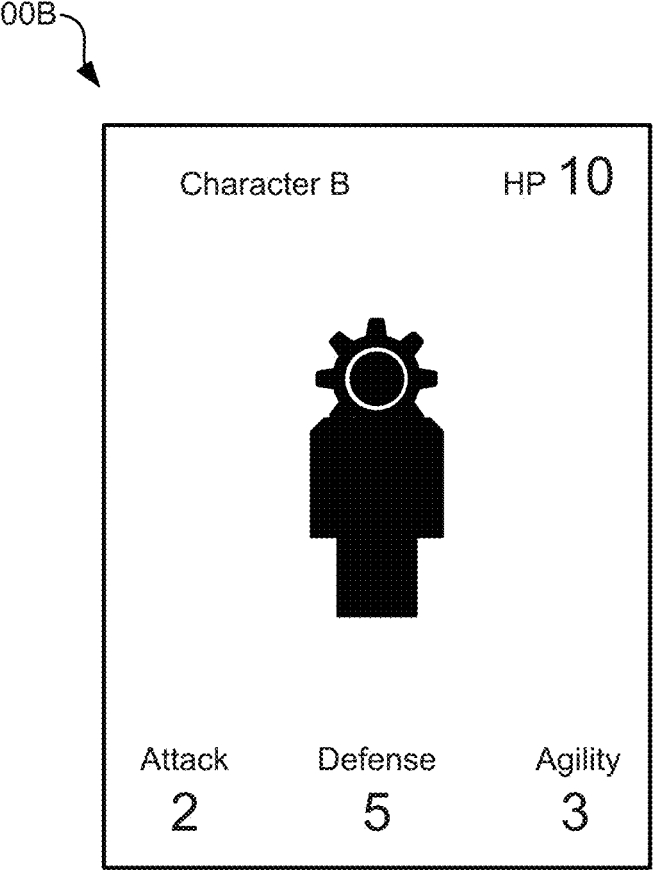
FIG. 5B illustrates a second exemplary main character card for inclusion in an original deck of cards for a game, in accordance with various examples.
Figure 14:
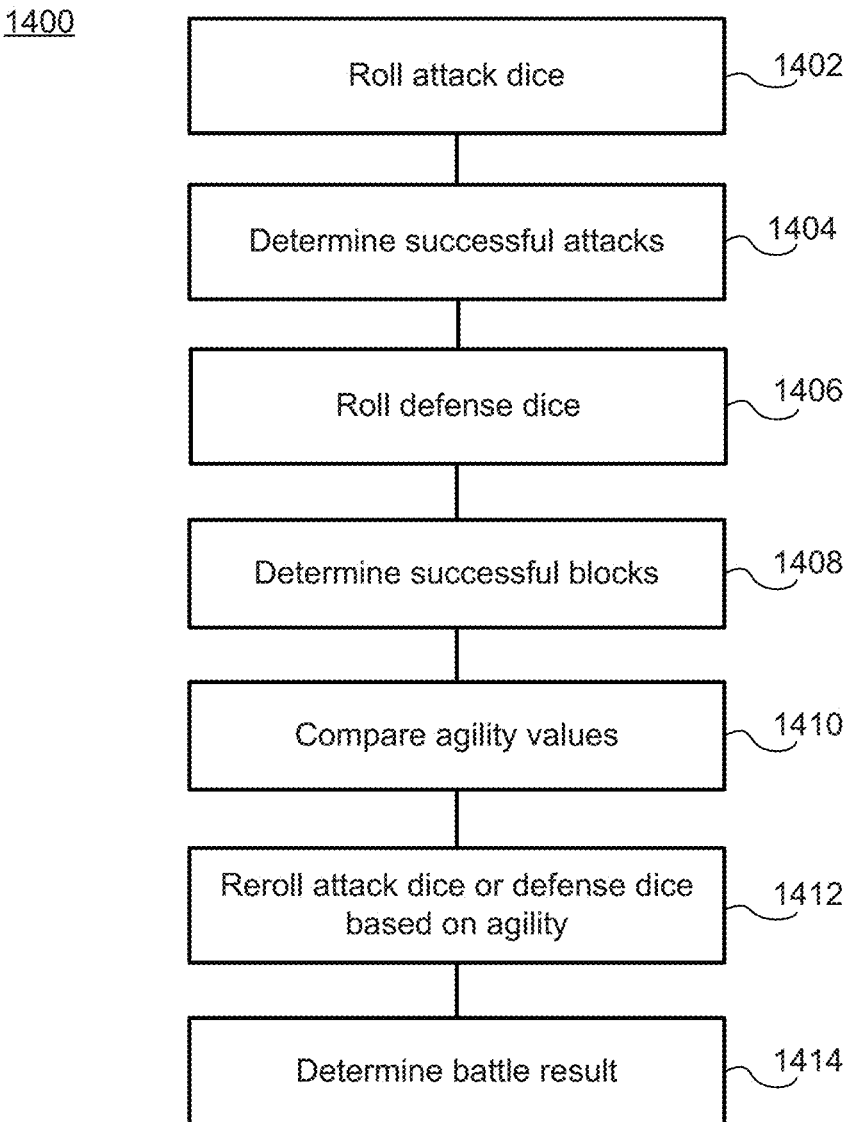
FIG. 14 illustrates a flowchart of an exemplary method for conducting a battle phase during a game, in accordance with various examples.

In various examples, the first player can conduct a battle phase (step 1212) of the first player's turn. The battle phase can be in response to completion of the draw phase, training phase, and/or preparation phase. With additional reference to FIG. 14 depicting a method 1400 for conducting a battle phase during a game, during the battle phase, the player conducting his/her turn can use that player's main character to attack the other player's main character. Thus, continuing with the example above, the first player can be the attacking player (with main character card 500A in FIG. 5A) and the opponent can be the defending player (with opponent main character 500B in FIG. 5B).

In various examples, during a battle phase, the first player can roll dice to attack with the first player main character (the dice being rolled for an attack can be referred to as "attack dice") (step 1402). Dice can be kept and/or rolled in dice section 265 and/or play area 220 of game surface 200. The number of attack dice rolled can be equal to the attack value of the first player's main character. Accordingly, the first player can roll three attack dice (equal to attack value 525 of main character card 500A). For each attack die rolled, the first player has a chance to obtain a successful attack against the opponent main character. In order for an attack to be successful, an attack die may be required to show (on the resulting die side that is upward-facing) an attack activation value. The attack activation value can be any suitable single value or a range of values. In various examples, the attack activation value can be a rolled or shown value of a 4 or a 5 on an attack die. Thus, in response to each attack die showing a value of 4 or 5, the first player main character achieves a successful attack on the opponent main character. In various examples, there can be an unblockable attack value, which, if rolled, the attacking player achieves a successful attack that cannot be blocked, even if the defending player achieves a successful block (discussed further herein). In various examples, the unblockable attack value can be a rolled or shown value of a 6 on an attack die. Thus, in response to each attack die showing a value of 6, the first player main character achieves an attack on the opponent main character that cannot be blocked.

In various examples, an effect of an action card, or an ability of a main character or upgraded main character, can adjust the number of attack dice rolled. Thus, as part of rolling the attack dice in step 1402, the first player can determine the number of attack dice to roll (or the number of attack rolls) considering the main character's attack value and any abilities or action cards.

In response to rolling the attack dice, the number of successful attacks is determined (step 1404). The number of attack dice rolls resulting in the attack activation value and/or the unblockable attack value can determine the number of successful attacks. In various examples, an effect of an action card, or an ability of a main character or upgraded main character, can adjust the number of successful attacks. Thus, as part of determining the number of successful attacks in step 1404, the first player can determine the number of attack dice rolled to show the attack activation value and/or the unblockable attack value and any abilities or action cards adjusting the attack dice rolling results.

In various examples, the defending player (the opponent in this case) can roll dice to defend the opponent main character from the first player's attack (the dice being rolled for a defense can be referred to as "defense dice") (step 1406). The number of defense dice rolled can be equal to the defense value of the opponent main character (with additional reference to FIG. 5B, in this example, main character card 500B can be the opponent main character). Accordingly, the opponent can roll five defense dice (equal to the defense value of 5 for opponent main character card 500B). For each defense die rolled, the opponent has a chance to obtain a successful block against the first player main character. In order for a block to be successful, a defense die may be required to show (on the resulting die side that is upward-facing) a defense activation value. The defense activation value can be any suitable single value or a range of values. In various examples, the defense activation value can be a rolled or shown value of a 4, 5, or 6 on a defense die. Thus, in response to each defense die showing a value of 4, 5, or 6, the opponent main character achieves a successful block of a successful attack from the first player main character.

In various examples, an effect of an action card, or an ability of a main character or upgraded main character, can adjust the number of defense dice rolled. Thus, as part of rolling the defense dice in step 1406, the opponent can determine the number of defense dice to roll (or the number of defense rolls) considering the opponent's defense value and any abilities or action cards. For example, in response to the opponent playing an action card like instant card 900B, opponent main character can increase the defense value by 1, and thus, the opponent can roll one additional defense die.

In response to rolling the defense dice, the number of successful blocks is determined (step 1408). The number of defense dice rolls resulting in the defense activation value can determine the number of successful blocks. In various examples, an effect of an action card, or an ability of a main character or upgraded main character, can adjust the number of successful blocks. Thus, as part of determining the number of successful blocks in step 1408, the opponent can determine the number of defense dice rolled to show the defense activation value and any abilities or action cards adjusting the defense dice rolling results.

In response to rolling the attack and defense dice, and determining the number of successful attacks and blocks, the first player and/or opponent may be able to reroll one or more dice. In various examples, an action card or ability can allow a reroll of one or more dice (e.g., effect 1025 of permanent card 1000 to reroll one die each turn). In various examples, the agility values of the main characters can allow the rerolling of one or more dice.

In various examples, the agility values of the first player main character and the opponent main character can be compared (step 1410). The main character with the higher agility value can reroll a number of dice equal to the difference between the agility values, which may be referred to as an agility difference. For example, in comparing agility value of 535 first player main character 500A (4) with the agility value of opponent main character 500B (3), the agility difference of 1 is in the first player's favor. Accordingly, the first player can reroll one attack die based on the agility difference (step 1412) to try and achieve a successful or unblockable attack.

In various examples, a player can reroll a number of respective dice that did not achieve a successful attack or block (i.e., a player can achieve a number of successful attacks equal to the respective main character attack value plus any effects from action cards or abilities, and/or a player can achieve a number of successful blocks equal to the respective main character defense value plus any effects from action cards or abilities). Thus, a player can achieve a number of successful attacks or blocks equal to the total possible number during the respective main character attack or defense. For example, in such examples, if a player has rolled three attack dice during the player's main character attack, two of which resulted in successful attacks, and the agility difference is 2 and in the player's favor, the player can reroll one die to try and achieve three successful attacks despite the agility difference of 2. In various examples, an attacking player can reroll dice that achieved successful attacks (but not unblockable attacks) to try and achieve unblockable attacks. In various examples, rerolling a die that achieved a successful attack to try for an unblockable attack puts the previously-rolled successful attack at risk if the reroll does not result in an attack activation value (i.e., if the reroll does not result in an attack activation value, the successful attack is lost). In various examples, rerolling a die that achieved a successful attack to try for an unblockable attack does not put the previously-rolled successful attack at risk, such that the successful attack will remain unless the die reroll results in an unblockable attack.

In various examples, a player can reroll dice that already achieved a successful attack or block, such that, with the reroll(s), a player has the opportunity to achieve a number of successful attacks or blocks greater than the total possible number during the respective main character attack or defense. For example, in such examples, if a player has rolled three attack dice during the player's main character attack, two of which resulted in successful attacks, and the agility difference is 2 and in the player's favor, the player can reroll two dice to try and achieve four successful attacks (even though only one attack die did not achieve a successful attack and only three successful attacks were possible during the initial attack).

During a battle phase, any number of dice (or other value selectors) can be utilized to determine attacks and blocks. For example, each player can have five separate dice, and the number of attack dice or defense dice can be rolled all at once (three attack dice for the first player). As another example, one die can be rolled three times (for main character card 500A during an attack), or any other suitable number of dice can be rolled an appropriate number of times to complete attack dice rolls, or defense dice rolls, to achieve the appropriate number of dice rolls.

In response to all attack dice, defense dice, and rerolled dice being rolled, the result of the battle phase can be determined (step 1414). The battle phase result can be determined by automatically reducing the defending (opponent's) main character's hit points by the number of unblockable attacks achieved by the first player main character. The number of successful attacks (without the unblockable attacks) can be compared to the number of successful blocks. In response to the number of successful attacks being greater than the number of successful blocks by an attack difference, the defending (opponent's) main character's hit points can be reduced by a number equal to the attack difference. In response to the number of successful blocks being greater than or equal to the number of successful attacks, the defending (opponent's) main character's hit points can be maintained at the previous level (other than as reduced by unblockable attacks or any hit point reduction resulting from character abilities or action cards). For example, say first player main character 500A rolled three attack dice, one of which achieved an unblockable attack, one achieved a successful attack, and one did not achieve either. In response, opponent main character 500B rolled five defense dice, three of which achieved successful blocks. The agility rerolls resulted in no further successful attacks. Comparing the results of the attack and defense dice rolls, opponent main character 500B may have its hit point value decreased by 1 from the unblockable attack to 9. However, because the number of successful blocks (3) is greater than the number of successful attacks (1), the opponent main character 500B hit point value is maintained at 9. Had the number of successful attacks been greater than the number of successful blocks, the opponent main character 500B hit point value would have been further reduced by the difference therebetween.

In various examples, after comparing the successful attacks and blocks, and determining the outcome of the dice rolls, any further adjustments to the resulting hit point adjustment can be made. For example, a main character's ability or action cards can adjust the number of successful attacks, the number of successful blocks, and/or the damage given or received during a turn. For example, ability 567 of upgraded main character 550 can negate a successful block, thus allowing one more damage to be done to the defending main character if the attacking main character rolled a sufficient number of successful attacks. As another example, equipment card 700 instructions the negation of one-fourth of damage done to the respective main character every turn, so after determining the result of the attack and defense dice rolls, the damage done to the respective main character can be reduced by one-fourth (e.g., rounding up or down to the nearest whole number of reduced damage in response to a the damage reduction being a fraction).

Accordingly, with reference back to method 1200, the outcome of a battle phase can be determined by (step 1214) taking into account the results of the attack and defense dice rolls, and character abilities and action card effects. The outcome of a battle phase can be the reduction of the defending main character's hit points, or the maintenance of the defending main character's hit points at a previous level. In response to damage being dealt to the defending main character as a result of the battle phase outcome, the hit points of the defending main character can be reduced by such damage amount.

Hit points can be tracked in any suitable manner. For example, for every damage dealt to a main character, an object (e.g., a marble, chip, token, or the like) can be placed on or around, or can be otherwise associated with, the main character to indicate the amount of damage that main character has taken (e.g., each object can represent one damage). In response to the number of objects associated with a main character equaling the total hit point value for the main character, the main character may be defeated (i.e., the hit points are reduced to zero). As another example, a player can have a hit point die (e.g., a D20), and can set the hit point die to have the surface showing a value equal to the main character's hit point value facing upward. Each time the main character's hit points are adjusted (reduced or increase), the player can reflect such a hit point adjustment by moving the hit point die to show the appropriate value on the upward-facing surface.

In response to determining the outcome of a battle phase 1214, the attacking player's turn ends. Accordingly, steps 1206-1214 of method 1200 are a turn 1216 of a game system, in accordance with various examples. If the defending main character is not defeated (i.e., if the defending main character has hit points left after the battle phase of the respective turn), the game advances by giving the player of the defending main character a turn to be the attacking main character. Accordingly, proceeding with the example above, in response to opponent main character having hit points left after the battle phase in which first player main character was attacking opponent main player, it can become the opponent's turn, during which the opponent main character will be the attacking main character and the first player main character can be the defending main character. Accordingly, method steps 1206-1214 can be repeated by opponent for the opponent's turn in a similar fashion to such steps being completed by the first player as discussed herein. That is, the opponent can conduct a draw phase (and draw one or more actions cards from opponent's action card deck), a training phase (and play a training card and dispose the training card under the opponent main character card, as discussed herein), a preparation phase (and play one or more action cards), and a battle phase in which the opponent main character attacks the first player main character. Any damage resulting from the opponent main character's attack during the battle phase can be applied to the first player main character. During opponent's turn, the first player may not act during steps 1206-1210, similar to how opponent does not act during such steps during the first player's turn, described herein.

In various examples, for each turn, both players (e.g., the first player and the opponent) can each act during steps 1206-1210, and for the battle phase, one player is the attacking player and the other player is the defending player. In such examples, each player can draw at least one card during step 1206, play at least one training card during step 1208, and/or play at least one action card during step 1210, then conduct the battle phase. Upon conclusion of the battle phase, if one of the main characters is not defeated, the players can switch between being the attacking and defending players, and conduct another turn 1216.

The players can take turns 1216 until a round of the game ends. The outcome of a round can be determined (step 1218) in response to the hit points of one of the main characters being reduced to zero (that main character is defeated). In response, the defeated main character card is placed in results section 260 of game surface 200. The defeated main character card can be placed in a position to indicate defeat, such as horizontally, at an angle (e.g., a nonparallel, nonorthogonal angle) relative to the edge of the game surface (e.g., the game surface edge proximate to the respective player), facedown, and/or the like. The victorious main character card for the other player can be placed in that player's results section 260 of game surface 200. The victorious main character card can be placed in a position to indicate victory, such as vertically, faceup, and/or the like.

In response to a round ending, a game can advance to the next round (step 1219). For a subsequent round, method 1200 can return to step 1204 to conduct another round 1220. All active action cards from the previous round can be discarded or reshuffled back into the action card deck. The winning player of the round can select a new main character from his/her main character deck, and the losing player of the round can select a new main character from his/her main character deck. In various examples, the players can select their respective main character cards similar to the beginning (selecting them without revealing the selection to the other player, and then simultaneously revealing). In various examples, the winning player can select a main character and reveal it to the losing player, and in response the losing player can select a main character. This can give the losing player the chance to select a main character that may be better suited to oppose the winning player's main character selection.

In various examples, the first turn of a first round can comprise all phases of a turn (draw, training, preparation, and battle phases). In various examples, as discussed herein, the player with the first turn of the first round (the very first turn of the game) may not conduct a battle phase to allow the other player to have one turn to prepare for a battle phase. In various examples, the player with the first turn of a second or subsequent round can conduct all phases of a turn (e.g., because it is not the very first turn of the game).

If a game is a single-round game, the game may end with the defeat of the one of the main characters. If a game is a multi-round game, the game may end after two of one player's main characters are defeated (e.g., one player wins two out of three rounds). A game can continue for any desired number of rounds.

Figure 15:
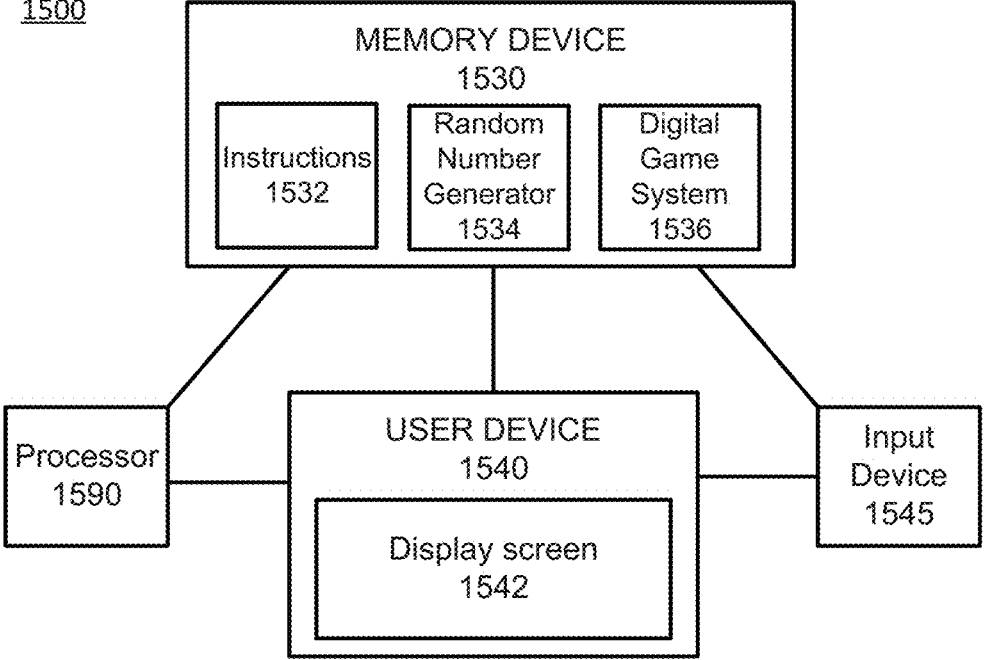
FIG. 15 illustrates a schematic diagram of an electronic or digital game system, in accordance with various examples.
Figure 16:
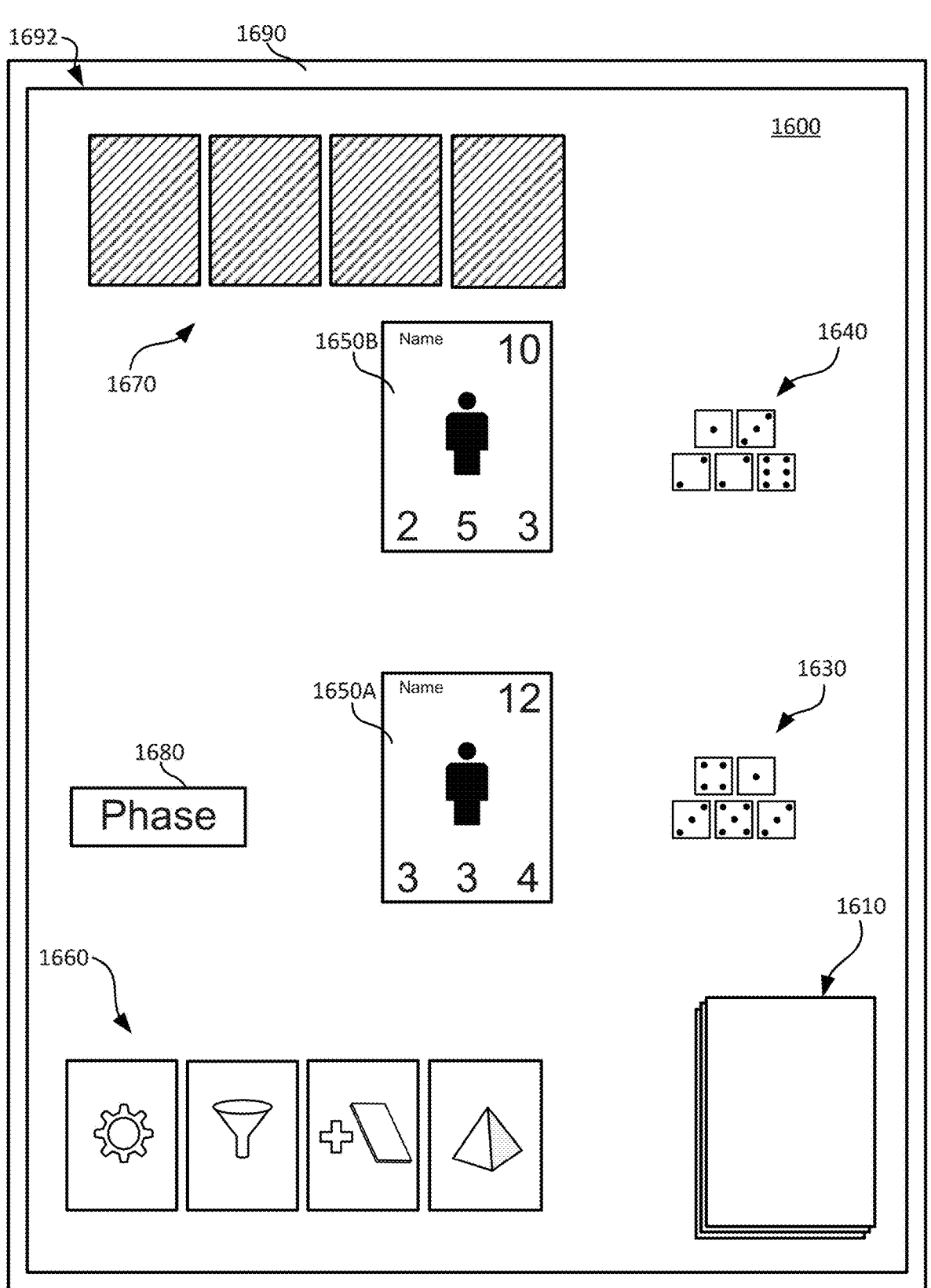
FIG. 16 illustrates an exemplary graphical user interface for an electronic or digital game system, in accordance with various examples.

FIGS. 1-14 depict components and methods for a game system 100 implemented as a physical system. In various examples, the game of game system 100 can be implemented electronically and/or digitally. With reference to FIG. 15, in accordance with various examples, a system 1500 may be computer-based, and may comprise a processor 1590, a tangible non-transitory computer-readable memory device 1530, a user device 1540, and/or an input device 1545. In various examples, any or all of the components of system 1500 can be integrated, and/or in electronic communication, with one another via one or more application programming interfaces (APIs). System 1500 and/or any of the components comprised therein can be computer-based, and can comprise a processor (e.g., processor 1590), a tangible non-transitory computer-readable memory, and/or a network interface. Instructions stored on the tangible non-transitory memory (e.g., instructions 1532) can allow system 1500 or processor 1590, or the components therein, to perform various functions, as described herein.

In various examples, memory device 1530 can comprise hardware and/or software capable of storing data and/or analyzing information. Memory device 1530 can comprise a server appliance running a suitable server operating system (e.g., MICROSOFT INTERNET INFORMATION SER-VICES or, "IIS") and having database software (e.g., ORACLE, mySQL) installed thereon. Memory device 1530 can be in electronic communication with a processor 1590, a user device 1540, and/or an input device 1545 via a network. As such, memory device 1530 can be able to communicate, and/or share information, with processor 1590, user device 1540, and/or input device 1545. Memory device 1530 can comprise a digital game system 1536 and its components, and/or instructions therefor (e.g., instructions 1532). Digital game system 1536 can be similar to game system 100 and its components and processes (as discussed herein in relation to FIGS. 1-14), such as a digital version thereof, including a digital game surface, digital cards (e.g., digital main character cards, digital upgraded main character cards, and/or digital action cards including digital training cards, digital equipment cards, digital single use cards, digital instant cards, digital permanent cards, and/or digital upgrade cards), and/or digital value selectors (e.g., digital dice). Digital main characters and digital upgraded main characters can have the same or similar characteristics or functions within a game as the physical counterparts, e.g., main character cards 500A,B and upgraded main character cards 550. Each digital action card type can have the same or similar characteristics, effects, and/or functions within a digital game as the physical action card counterparts within a physical game, as discussed herein. Additionally, the game rules, flow, actions, and the like associated with and discussed with regard to game system 100 and FIGS. 1-14 can also apply to digital game system 1536 and FIGS. 15-19. Instructions 1532 can be configured to allow system 1500 to perform various operations to facilitate digital game system 1536 and its functions. Random number generator 1534 comprised in memory device 1530 can be utilized in operating digital game system 1536, as discussed herein. In various examples, instructions 1532, random number generator 1534, and/or digital game system 1536 can be comprised in one system, device, and/or component of system 1500 and/or memory device 1530, or the same can be separated or combined in any suitable configuration.

In various examples, the digital action cards can be represented as a digital symbol or image with or without a digital card. For example, a digital equipment item (similar to an digital equipment card discussed herein) can be represented as a digital image or symbol for the respective equipment, a digital training item (similar to an digital training card discussed herein) can be represented as a digital image or symbol for the respective training, a digital single use or instant item (similar to an digital single use or instant card discussed herein) can be represented as a digital image or symbol for the respective single use or instant, a digital permanent item (similar to an digital permanent card discussed herein) can be represented as a digital image or symbol for the respective permanent, and/or a digital single upgrade item (similar to an digital upgrade card discussed herein) can be represented as a digital image or symbol for the respective upgrade.

In various examples, memory device 1530 can store program code and or instructions 1532 executable by the processor 1590. Memory device 1530 can also store other data such as image data, event data, player input data, random or pseudo-random number generators, and applicable game rules that relate to the play of the digital game. Memory device 1530 can be a tangible non-transitory computer-readable memory. Random number generator 1534 can assist in randomizing the cards in a digital card deck and randomizing selection thereof, and/or randomizing the value resulting from rolling digital dice or conducting other like actions. The random number generator 1534 can use various methodologies, for example, the random number generator techniques and systems set forth in U.S. Pat. No. 9,336,646 (which is hereby incorporated by reference), or any other random number generator techniques or systems now known or hereinafter devised.

In various examples, memory device 1530 can include random access memory (RAM), which can include non-volatile RAM (NVRAM), magnetic RAM (MRAM), ferro-electric RAM (FeRAM), and other forms as commonly understood in the gaming industry. In various examples, memory device 1530 can include read only memory (ROM). In various embodiments, memory device 1530 includes flash memory and/or EEPROM (electrically erasable programmable read only memory). It should be appreciated that, any other suitable magnetic, optical, and/or semiconductor memory can operate in conjunction with the system 1500.

Input device(s) 1545 can be an aspect of a graphical user interface (GUI) displayed on display screen which, in response to being selected, allows a user of system 1500 to produce an input signal received by a processor, which can command the processor to perform or facilitate performance of an operation. For example, input device 1545 can be a digital button displayed on a display screen (e.g., a touch screen) which can be selected by tapping the screen on a touch screen or selecting input device 1545 with a computer mouse, and/or input device 1545 can be a physical button to input information.

In various examples, memory device 1530 and/or user device 1540 can comprise a processor therein and/or utilize a processor in another component of system 1500 (e.g., processor 1590). The processor can be configured to cause the components of digital game system 1536 to interact with one another, to receive inputs from the user through an input device 1545, perform or execute the functions, or instruct/facilitate the performance of functions, including, for example, presenting information on a GUI to facilitate gameplay of a digital game system, randomly provide digital action cards to a player as part of their hand, randomly provide and/or play digital action cards in response to providing a computer player for one-player game play, providing random value selection (e.g., rolling digital dice as part of a battle phase of a game), determining outcomes of different plays (e.g., the effects of digital cards that are played and/or active), turns (e.g., determining whether the defending digital main character takes damage, and if so, how much), rounds (e.g., determining if/when a main character has been defeated), and/or the like.

In various examples, user device 1540 can incorporate hardware and/or software components. For example, user device 1540 can comprise a server appliance running a suitable server operating system (e.g., MICROSOFT INTERNET INFORMATION SERVICES or, "IIS"). User device 1540 can be any device that allows a user to communicate with a network (e.g., a personal computer, personal digital assistant (e.g., IPHONE®, BLACKBERRY®), tablet, smartphone, cellular phone, and/or the like). User device 1540 can be in electronic communication with electronic memory device 1530, processor 1590, and/or input device 1545. In various examples, user device 1540 can comprise an input device 1545 (i.e., a physical or digital button). User device 1540 can allow the user of system 1500 to interact with the other components of system 1500. For example, user device 1540 can comprise display screen 1542, which can display a GUI (e.g., GUI 1600, discussed in relation to FIG. 16) provided by system 1500. Display screen 1542 displaying a GUI can allow the user to select input device(s) 1545 to send a signal to system 100 indicating a desired action by system 1500. In various examples, any action performed by a user through system 1500 can be communicated to system 1500 and performed by a processor (e.g., processor 1590).

User device 1540 includes any device (e.g., personal computer, mobile device, etc.) which communicates via any network, for example such as those discussed herein. In various examples, user device 1540 can comprise and/or run a browser, such as MICROSOFT® INTERNET EXPLORER®, MOZILLA® FIREFOX®, GOOGLE® CHROME®, APPLE® Safari, or any other of the myriad software packages available for browsing the internet. For example, the browser can communicate with a server via network by using Internet browsing software installed in the browser. The browser can comprise Internet browsing software installed within a computing unit or a system to conduct online transactions and/or communications. These computing units or systems can take the form of a computer or set of computers, although other types of computing units or systems can be used, including laptops, notebooks, tablets, handheld computers, personal digital assistants, set-top boxes, workstations, computer-servers, mainframe computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. In various examples, browser can be configured to display an electronic channel.

In various examples, a user device (e.g., as part of system 1500) described herein can run a web application or native application to communicate with system 1500. A native application can be installed on the user device via download, physical media, or an app store, for example. The native application can utilize the development code base provided for use with the operating system and capable of performing system calls to manipulate the stored and displayed data on the user device and communicates with system 1500 and/or any components thereof. A web application can be web-browser compatible and written specifically to run on a web browser. The web application can thus be a browser-based application that operates in conjunction with system 1500.

In various examples, memory device 1530 can comprise instructions 1532 to present a GUI to a player on a user device to allow digital game system 1536 to be played. With additional reference to FIG. 16, display screen 1692 of a user device 1690 (an example of display screen 1542 on user device 1540) can display components of digital game system 1536 on a game system GUI 1600 to facilitate playing of the digital game. The components of digital game system 1536 can be similar to the physical game discussed in relation to game system 100.

Similar to game system 100 discussed in relation to FIGS. 1-14, digital game system 1536 can comprise a digital deck of cards, which is an original deck of digital cards having various digital card types. A digital card deck for digital game system 1536 can comprise one or more sub-decks of digital cards (each sub-deck may also be referred to as a digital "deck" herein). For example, a digital card deck for digital game system 1536 can comprise a digital action card deck 1610 (similar to action card deck 410 of game system 100, including the number of digital action cards therein), a digital main character deck (similar to main character deck 420 of game system 100, including the number of digital main character cards therein), and/or a digital upgraded main character deck (similar to upgraded main character deck 430 of game system 100, including the number of digital upgraded main character cards therein). A player's digital deck of cards can be compiled by the player collecting physical cards having digital card counterparts, or digital-only cards, and create the digital card deck on the player's account or profile within digital game system 1536. In various examples, digital game system 1536 can comprise one or more digital value selectors, such as one or more digital dice 1630, 1640 (similar to dice 300 of game system 100), or any other suitable digital value selector that can depict or facilitate random value selection (e.g., digital spinners, or the like).

Similar to game play of game system 100, a first player can have a first player digital main character card 1650A, and an opponent can have an opponent digital main character 1650B, which can be displayed by a processor on GUI 1600. The (upgraded) digital main character cards can have the same or similar displayed structure on GUI 1600 as the structure of the (upgraded) main character cards discussed in relation to game system 100 (e.g., main character cards 500A and 500B in FIGS. 5A and 5B). For example, a digital main character card can comprise a main character name or title and hit point value proximate a top edge of the digital card, and an attack value, defense value, and agility value proximate a bottom edge of the digital card. For reference, digital main character card 1650A is a digital version of main character card 500A in FIG. 5A, and digital main character card 1650B is a digital version of main character card 500B in FIG. 5B, and the aspects or statistics displayed on the digital cards correspond to the aspects or statistics displayed on the physical cards. In various examples, the main characters is the digital game system can be presented on the GUI as digital figures on digital cards, or as digital figures without digital cards.

In various examples, GUI 1600 can be presented to a first player (e.g., the user of user device 1590). Thus, the opponent can be another user utilizing another device and providing inputs to system 1500 to play digital game system 1536, or the opponent can be a computer player operated by a processor, thus allowing one-player gameplay. GUI 1600 can display the first player's digital action card deck 1610, from which the first player will receive the actions cards for the first player's hand or inventory, and from which the first player can draw one or more action cards during a draw phase of a turn, as discussed herein. Digital action card deck 1610 can be displayed in GUI 1600 facedown so the first player cannot see the next digital action card, or any digital cards, in action card deck 1610. The first player's inventory or hand 1660 can be displayed on GUI 1600, which are the digital action cards available to play by the first player during the first player's turn (e.g., during the training phase and/or preparation phase). The opponent's inventory or hand 1670 can be displayed on GUI 1600 facedown (i.e., hidden from the first player viewing GUI 1600), which can be the digital cards available to play by the opponent during the opponent's turn (e.g., during the training phase and/or preparation phase). The inventory or hand of digital cards can comprise any suitable number of cards (e.g., about four or five digital cards).

Figure 17:
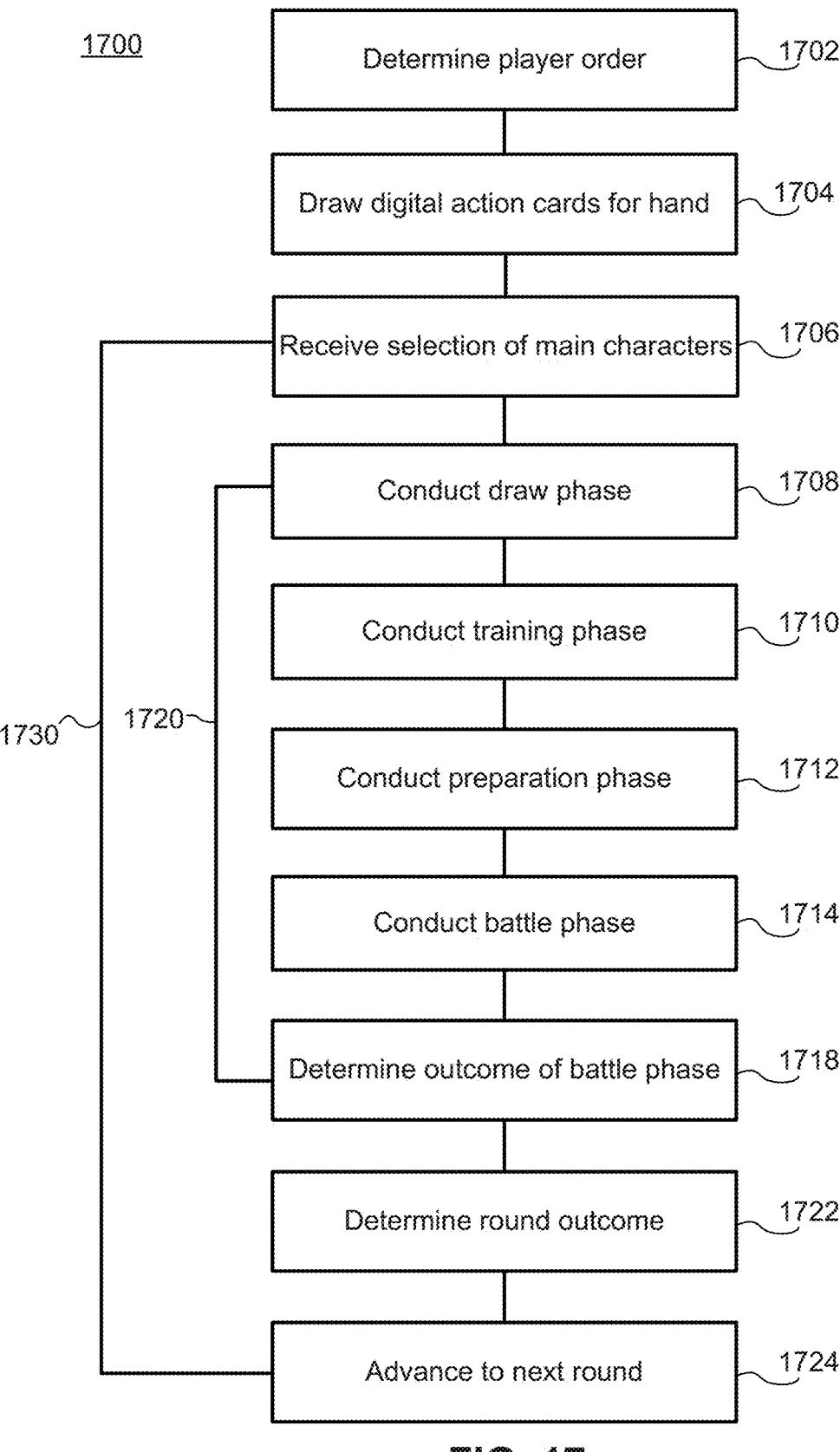
FIG. 17 illustrates a flowchart of an exemplary method for playing a digital game system, in accordance with various examples.

FIG. 17 illustrates a method 1700 for playing a digital game system 1536, for example, utilizing GUI 1600, in accordance with various examples. The functions and/or operations of digital game system 1536 can be performed by one or more processors, as discussed herein. In various examples, the processor can determine a player order (step 1702) for the game, round, or turn. For example, the processor can randomly determine the player order by rolling digital dice associated with each player and granting the first turn to the player with the highest digital dice roll, flipping a digital coin, and/or the like. In response to a round ending, the processor can determine that the player who lost the previous round will go first in the subsequent round.

In various examples, the processor can shuffle a digital action card deck for the first player and the second player. The processor can use random number generator 1534 to randomize the action cards in the action card decks. To being a game or round, about five cards can be drawn for each player from the respective digital action card deck to form the player's inventory or hand (step 1704). Such cards for the players' hands can be randomly selected from the respective digital action card deck and/or can be the first five digital cards in the randomized (i.e., shuffled) digital action card deck.

In various examples, a player can select a digital main character card to play during a round, and the processor can receive the main character selection (step 1706). For example, a player's main characters from a digital main character deck can be presented on GUI 1600 from which the player can select. The player can select the desired digital main character (e.g., by clicking on the desired digital main character card), and the processor can receive such selection. The opponent can select a main character similarly, and the processor can receive such selection. In response to the opponent being a computer player, the processor can select a digital main character card to play.

In response to the main character selection, the digital main character cards can be displayed on GUI 1600. For example, for first player, digital main character card 1650A can be displayed, and for the opponent, digital main character card 1650B can be displayed. In various embodiments, to begin a game or round, the main character selections can remain facedown until both players have selected their main characters. In response to both players making their main character selections, the processor can reveal the main characters and display the digital main character cards on GUI 1600. In response to a second or subsequent round, the winning player from the previous round can select their digital main character card first, and the selection can be revealed on GUI 1600. In response, the losing player from the previous round can make a digital main character selection.

Proceeding as if the first player was determined to go first, to begin a turn, the processor can conduct a draw phase (step 1708, similar to step 1206 in method 1200 and discussion related thereto). The phase of a turn can be indicated by a phase indicator on GUI 1600 (e.g., phase indicator 1680). During a draw phase, the processor can select (i.e., draw) one or more digital cards from the digital action card deck 1610, and reveal the drawn digital action card to the first player on GUI 1600. A digital action card can be drawn from digital action card deck 1610 in response to the processor receiving a command from the first player to do so. For example, the player can click on digital action card deck 1610, which may be an input device 1545, and the processor can receive such an input. In response, one or more digital action cards can be drawn and added to the first player's hand 1660. In various examples, the first player may have an active digital action card or play a digital action card that can affect the draw phase of a turn. For example, the player can have an active digital equipment card or digital permanent card that allows the player to draw two action cards during the draw phase of each of the player's turns. The processor can detect such an active or played digital action card and adjust the draw phase accordingly.

In various examples, the processor can conduct a training phase (step 1710, similar to step 1208 in method 1200 and discussion related thereto) of the first player's turn. The training phase can be in response to completion of the draw phase. The processor can automatically advance to the training phase in response to completion of the draw phase (e.g., including updating phase indicator 1680). During the training phase, the first player can play one or more digital training cards. The available digital training cards in the first player's hand 1660 can be presented or emphasized in GUI 1600, from which the first player can select. The first player can select a desired digital training card to play, for example, by clicking on it, and the processor can receive such a selection. In response, the processor can remove the selected digital training card from the first player's hand 1660, and apply the benefit to first player main character 1650A (e.g., by increasing the attack, defense, and/or agility value, and/or the hit point value, of first player main character 1650A). A digital training card can have the same or similar effect and/or attributes in digital game system 1536 that a training card has in game system 100, as discussed herein in relation to step 1208 of method 1200 and training card 600 in FIG. 6A. The processor can automatically update the statistics of first player main character 1650A in response to the played digital training card. The played digital training card can be disposed on GUI 1600 under first player digital main character 1650A, with the statistic value increase exposed from under first player digital main character 1650A (similar to training card 600 being disposed under main character card 500A in FIG. 6B). In various examples, the processor can increase the level of first player digital main character 1650A for every digital training card associated therewith (e.g., one level increase for every training card). The respective digital main character's level can be presented and/or updated on GUI 1600 (e.g., on or proximate to first player digital main character card 1650A). There may be a training limit of about five training cards that can be associated with a digital main character. If the training limit has been met, in order for a player to play another digital training card, the player must select an active digital training card to discard. In response to receiving a selection to discard a digital training card, the processor can discard the selected digital training card and allow playing of another digital training card. If the first player does not have a digital training card or does not want to play a digital training card, the first player can select an input device indicating same. In response, the processor can advance to the next phase of the turn.

In various examples, the first player can conduct a preparation phase (step 1712, similar to step 1210 in method 1200 and discussion related thereto) of the first player's turn. The processor can automatically advance to the preparation phase in response to conclusion of the draw phase and/or training phase, and/or in response to the first player selecting an input device to advance to the preparation phase of the turn.

Figure 18:
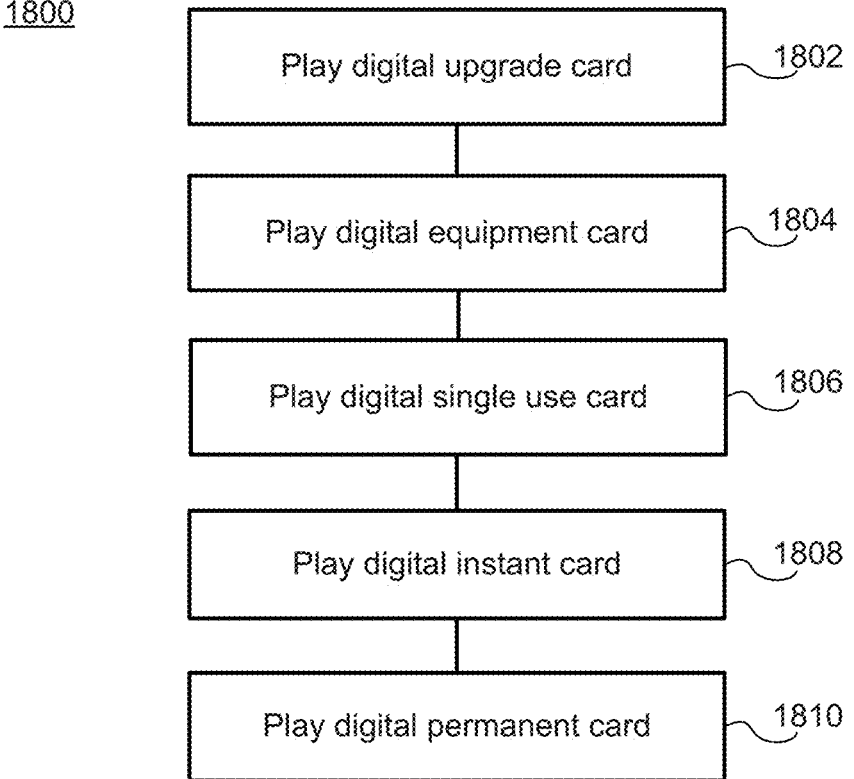
FIG. 18 illustrates a flowchart of an exemplary method for conducting a preparation phase during a digital game, in accordance with various examples.

With additional reference to FIG. 18 depicting a method 1800 for conducting a preparation phase during a game, during the preparation phase, the first player can elect to play one or more digital action cards (other than digital training cards, so a digital upgrade card(s), digital equipment card(s), digital single use card(s), digital instant card(s), and/or digital permanent card(s)) (similar to method 1300 in FIG. 13 and the discussion related thereto). As discussed herein, there are various types of digital action cards that can have an effect on the first player's or opponent's main character, such as its attack value or damage given, its defense value or damage received, its agility value, its hit points, the number of attack dice rolled during its attack, the number of defense dice rolled during its defense, the number of attack or defense dice rerolled based on the agility value, provide an ability to effect any of the foregoing, and/or any other desired action, and/or can have an effect on the player or the player's turn (or the opponent or the opponent's turn). In various example, some types, and/or any or all types, of digital action cards can comprise a level requirement, such that the active main character must have reached a certain level in order to play such a digital action card.

During the preparation phase, the first player can select a digital upgrade card from first player's hand 1660 to play (step 1802, similar to step 1302 in method 1300 and discussion related thereto). A digital upgrade card can have the same or similar effect and/or attributes in digital game system 1536 that an upgrade card has in game system 100, as discussed herein in relation to step 1302 of method 1300 and upgrade card 1100 in FIG. 11. The first player can select a digital upgrade card, for example, by clicking on the digital upgrade card in first player's hand 1660 on GUI 1600. The processor can receive the selection. In response, the processor can determine a digital upgraded main character card that is associated with the first player digital main character 1650A, and replace digital main character 1650A with the associated digital upgraded main character. In various examples, in response to the first player selecting a digital upgrade card to play, the processor can present the digital upgraded main character cards in the first player's digital upgraded main character deck, and the first player can select the desired digital upgraded main character. In response, the processor can confirm that the selected digital upgraded main character is an appropriate selection (e.g., that is associated with the digital main character, that the digital main character has the requisite level, etc.), and can upgrade the digital main character to the upgraded digital main character. Accordingly, the upgraded value statistics of the digital upgraded main character card (e.g., the upgraded attack, defense, agility, and/or hit point values) can be applied by the processor until the end of the round. In response to the digital upgrade card being utilized, the processor can discard the digital upgrade card.

During the preparation phase, the first player can play a digital equipment card (step 1804, similar to step 1304 in method 1300 and discussion related thereto). A digital equipment card can have the same or similar effect and/or attributes in digital game system 1536 that an equipment card has in game system 100, as discussed herein in relation to step 1304 of method 1300 and equipment card 700 in FIG. 7. The first player can select a digital equipment card, for example, by clicking on the digital equipment card in first player's hand 1660 on GUI 1600. The processor can receive the selection. In response, the processor can determine if the digital main character has a requisite level for the selected digital equipment card. If so, the processor can remove the selected digital equipment card from first player's hand 1660 and associate the digital equipment card with the digital main character (e.g., by disposing the digital equipment card proximate digital main character 1650A). The digital equipment card can have digital instructions associated therewith to execute the effect of the digital equipment card. The processor can cause to occur, and/or take into consideration, the effect of an equipment card at any appropriate time during a turn or round. There may be an equipment limit of about three digital equipment cards that can be associated with a digital main character. If the equipment limit has been met, in order for a player to play another digital equipment card, the player can select an active digital equipment card to discard. In response to receiving a selection to discard a digital equipment card, the processor can discard the selected equipment card and allow playing of another equipment card.

During the preparation phase, the first player can play a digital single use card (step 1806, similar to step 1306 in method 1300 and discussion related thereto). A digital single use card can have the same or similar effect and/or attributes in digital game system 1536 that a single use card has in game system 100, as discussed herein in relation to step 1306 of method 1300 and single use card 800 in FIG. 8. The first player can select a digital single use card, for example, by clicking on the digital single use card in first player's hand 1660 on GUI 1600. The processor can receive the selection. In response, the processor can determine if the digital main character has a requisite level for the selected digital single use card. If so, the processor can remove the selected digital single use card from first player's hand 1660 and effectuate the effect of the digital single use card at the appropriate time. That is, the processor can cause to occur, and/or take into consideration, the effect of a digital single use card at any appropriate time during a turn or round (e.g., during a battle phase and/or in determining the outcome of a battle phase). The digital single use card can have digital instructions associated therewith to allow the processor to execute the effect of the digital single use card. In response to being used or effectuated, the processor can discard the selected digital single use card.

During the preparation phase, the first player can play a digital instant card (step 1808, similar to step 1308 in method 1300 and discussion related thereto). A digital instant card can have the same or similar effect and/or attributes in digital game system 1536 that an instant card has in game system 100, as discussed herein in relation to step 1308 of method 1300 and instant cards 900A,B in FIG. 9. The first player can select a digital instant card, for example, by clicking on the digital instant card in first player's hand 1660 on GUI 1600. The processor can receive the selection. In response, the processor can determine if the digital main character has a requisite level for the selected digital instant card. If so, the processor can remove the selected digital instant card from first player's hand 1660 and effectuate the effect of the digital instant card at the appropriate time. That is, the processor can cause to occur, and/or take into consideration, the effect of a digital instant card at any appropriate time during a turn or round (e.g., during a battle phase and/or in determining the outcome of a battle phase). The digital instant card can have digital instructions associated therewith to allow the processor to execute the effect of the digital instant card. In response to being used or effectuated, the processor can discard the selected digital instant card.

During the preparation phase, the first player can play a digital permanent card (step 1810, similar to step 1310 in method 1300 and discussion related thereto). A digital permanent card can have the same or similar effect and/or attributes in digital game system 1536 that a permanent card has in game system 100, as discussed herein in relation to step 1310 of method 1300 and permanent card 1000 in FIG. 10. The first player can select a digital permanent card, for example, by clicking on the digital permanent card in first player's hand 1660 on GUI 1600. The processor can receive the selection. In response, the processor can determine if the digital main character has a requisite level for the selected digital permanent card. If so, the processor can remove the selected digital permanent card from first player's hand 1660 and associate the digital permanent card with the digital main character (e.g., by disposing the digital permanent card proximate digital main character 1650A). The digital permanent card can have digital instructions associated therewith to execute the effect of the digital permanent card. The processor can cause to occur, and/or take into consideration, the effect of a permanent card at any appropriate time during a turn or round. There may be a permanent limit of one or two digital permanent cards that can be associated with a digital main character. If the permanent limit has been met, in order for a player to play another digital permanent card, the player must select an active digital permanent card to discard. In response to receiving a selection to discard a digital permanent card, the processor can discard the selected digital permanent card and allow playing of another digital permanent card.

If the first player does not have a digital action card or does not want to play a digital action card during the preparation phase, the first player can select an input device indicating same. In response, the processor can advance to the next phase of the turn.

In various example, a game can comprise a digital action card limit per turn. For example, a player can be limited to playing one, or two, or three digital action cards from the player's hand per turn. In various examples, the playing of a digital instant card may not count toward the maximum number of digital action cards allowed to be played during a player's turn or preparation phase.

Figure 19:
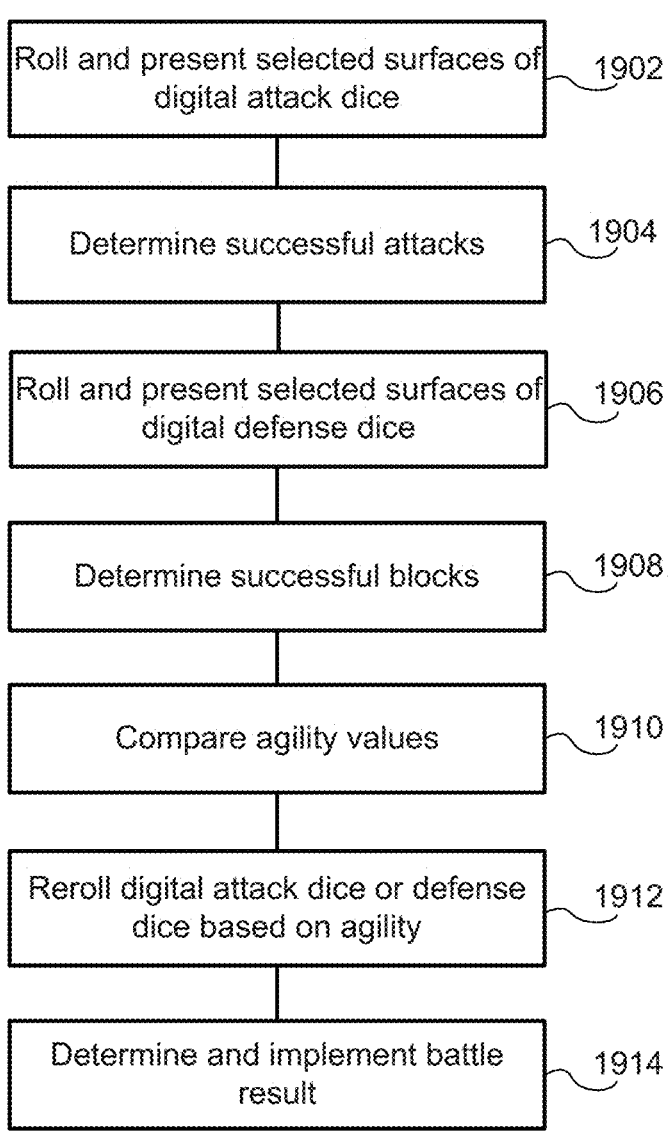
FIG. 19 illustrates a flowchart of an exemplary method for conducting a battle phase during a digital game, in accordance with various examples.

In various examples, the first player can conduct a battle phase (step 1714, similar to step 1212 in method 1200 and discussion related thereto) of the first player's turn. The processor can automatically advance to the battle phase in response to conclusion of the draw phase, training phase, and/or preparation phase, and/or in response to the first player selecting an input device to advance to the battle phase of the turn. With additional reference to FIG. 19 depicting a method 1900 for conducting a battle phase during a game, during the battle phase, the player conducting his/her turn can use that player's digital main character to attack the other player's digital main character. Thus, continuing with the example above, the first player can be the attacking player (with main digital character card 1650A) and the opponent can be the defending player (with opponent digital main character 1650B).

In various examples, during a battle phase, the processor can roll digital dice 1630, which are associated with the first player. Because the first player is the attacking player, for this turn, digital dice 1630 can be digital attack dice 1630. Thus, the processor can roll digital attack dice 1630 and present the selected surfaces of digital attack dice 1630 (step 1902). As discussed herein, the process can utilize random number generator 1534 to roll the digital dice and select the rolled values (the selected value of each die being the value on the surface that lands upward or outward facing on GUI 1600). The number of digital attack dice rolled can be equal to the attack value of the first player's digital main character. Accordingly, the processor can roll three attack dice (equal to attack value of digital main character card 1650A). For each digital attack die rolled, the first player has a chance to obtain a successful attack against the opponent digital main character. In order for an attack to be successful, a digital attack die may be required to show the attack activation value. Thus, in response to each digital attack die showing the attack activation value, the first player main character achieves a successful attack on the opponent digital main character. In various examples, if an unblockable attack value is rolled, the attacking player achieves a successful attack that cannot be blocked, even if the defending player achieves a successful block.

In various examples, an effect of a digital action card, or an ability of a digital main character or digital upgraded main character, can adjust the number of digital attack dice rolled. Thus, as part of rolling the digital attack dice in step 1902, the processor can determine the number of digital attack dice to roll (or the number of digital attack rolls) considering the digital main character's attack value and any abilities or digital action cards.

In response to rolling the digital attack dice, the processor can determine the number of successful attacks (step 1904). The processor can compare the selected values from the digital attack dice rolled, and the digital attack dice showing the attack activation value and/or the unblockable attack value can be determined to be successful attacks. In various examples, an effect of a digital action card, or an ability of a digital main character or upgraded digital main character, can adjust the number of successful attacks. Thus, as part of determining the number of successful attacks in step 1904, the processor can determine the number of digital attack dice rolled to show the attack activation value and/or the unblockable attack value and any abilities or digital action cards adjusting the digital attack dice rolling results.

In various examples, the processor can roll digital dice 1640, which are associated with the opponent (the defending player in this turn). Because the opponent is the defending player, for this turn, digital dice 1640 can be digital defense dice 1640. Thus, the processor can roll digital defense dice 1640 and present the selected surfaces of digital defense dice 1640 (step 1906). The number of defense dice rolled can be equal to the defense value of the opponent digital main character. Accordingly, the processor can roll five defense dice (equal to the defense value of 5 for opponent digital main character card 1650B). For each digital defense die rolled, the opponent has a chance to obtain a successful block against the first player digital main character. In order for a block to be successful, a digital defense die may be required to show the defense activation value. Thus, in response to each digital defense die showing the defense activation value, the opponent digital main character achieves a successful block of a successful attack from the first player digital main character.

In various examples, an effect of a digital action card, or an ability of a digital main character or digital upgraded main character, can adjust the number of digital defense dice rolled. Thus, as part of rolling the digital defense dice in step 1906, the processor can determine the number of digital defense dice to roll (or the number of digital defense rolls) considering the opponent's defense value and any abilities or digital action cards. For example, in response to the opponent playing a digital action card like a digital instant card resembling instant card 900B, opponent digital main character can increase the defense value by 1, and thus, the opponent can roll one additional digital defense die.

In response to rolling the digital defense dice, the processor can determine the number of successful blocks (step 1908). The number of digital defense dice rolls resulting in the defense activation value can determine the number of successful blocks. In various examples, an effect of a digital action card, or an ability of a digital main character or digital upgraded main character, can adjust the number of successful blocks. Thus, as part of determining the number of successful blocks in step 1908, the processor can determine the number of digital defense dice rolled to show the defense activation value and any abilities or action cards adjusting the digital defense dice rolling results.

In response to rolling the digital attack and defense dice, and determining the number of successful attacks and blocks, the processor can determine whether any digital attack dice or digital defense dice can be rerolled. In various examples, a digital action card or character ability can allow a reroll of one or more digital dice (e.g., an effect of a digital permanent card resembling effect 1025 of permanent card 1000 to reroll one die each turn). In various examples, the agility values of the main characters can allow the rerolling of one or more digital dice.

In various examples, the processor can compare the agility values of the first player digital main character and the opponent digital main character can be compared (step 1910). The digital main character with the higher agility value can reroll a number of digital dice equal to the difference between the agility values, which may be referred to as an agility difference. For example, in comparing agility value of first player digital main character 1650A (4) with the agility value of opponent digital main character 1650B (3), the agility difference of 1 is in the first player's favor. Accordingly, the processor can determine the agility difference and facilitate the first player rerolling one digital attack die based on the agility difference (step 1912) to try and achieve a successful or unblockable attack.

In various examples, "rolling" digital dice can be interpreted as randomly determining an outcome(s) for one or more events in a game in any suitable manner. Digital dice, as discussed herein, can be presented on the GUI and used, or a spinning wheel, a spinner, or any other graphical representation of a random value selector. Or, as another example, the processor and/or random number generator can otherwise determine the number of unblockable attacks, successful attacks, and/or successful blocks, or other outcomes, based on the attack, defense, and/or agility values and probabilities associated with achieving each outcome. For example, the processor can determine a number of unblockable attacks with a probability of 1 in 6 (e.g., one side of a six-sided die achieves an unblockable attack), and successful attacks and/or successful blocks with a probability of 1 in 2 (e.g., three sides of a six-sided die achieve a successful attack and/or block) based on the appropriate attack, defense, and/or agility values. In response to the processor determining the number of unblockable attacks, successful attacks, and/or successful blocks, and/or other outcomes, the processor can present the number of the same on the GUI (e.g., as a single number).

In response to all digital attack dice, digital defense dice, and rerolled digital dice being rolled, the processor can determine the result of the battle phase (step 1914). The battle phase result can be determined by the processor reducing the defending (opponent's) digital main character's hit points by the number of unblockable attacks achieved by the first player digital main character. The processor can compare the number of successful attacks (without the unblockable attacks) to the number of successful blocks. In response to the number of successful attacks being greater than the number of successful blocks by an attack difference, the processor can reduce the defending (opponent's) digital main character's hit points by a number equal to the attack difference. The processor can indicate on or proximate opponent digital main character 1650B the reduction in hit points and/or opponent digital main character's 1650B remaining hit points. In response to the number of successful blocks being greater than or equal to the number of successful attacks, the processor can maintain the defending (opponent's) digital main character's hit points at the previous level (other than as reduced by unblockable attacks or any hit point reduction resulting from character abilities or digital action cards). For example, say first player digital main character 1650A rolled three digital attack dice, two of which achieved successful attacks, and one did not. In response, opponent digital main character 1650B rolled five digital defense dice, one of which achieved successful blocks. The agility rerolls resulted in no further successful attacks. Comparing the results of the attack and defense digital dice rolls, the processor may decrease the hit points for opponent digital main character 1650B by 1 the attack difference between the two successful attacks and the one successful block.

In various examples, after comparing the successful attacks and blocks, and determining the outcome of the dice rolls, the processor can make any further adjustments to the resulting hit point adjustment. For example, a digital main character's ability or digital action cards can adjust the number of successful attacks, the number of successful blocks, and/or the damage given or received during a turn.

Accordingly, with reference back to method 1700, the outcome of a battle phase can be determined by (step 1718) taking into account the results of the digital attack and defense dice rolls, and character abilities and digital action card effects. The outcome of a battle phase can be the reduction of the defending digital main character's hit points, or the maintenance of the defending digital main character's hit points at a previous level. In response to damage being dealt to the defending digital main character as a result of the battle phase outcome, the processor can reduce the hit points of the defending digital main character by such damage amount.

Hit points can be tracked in any suitable manner. For example, the processor can reduce the hit point value for the respective digital main character in the hit point value area of the digital main character card, or there can be a portion of GUI 1600 for remaining hit points proximate the respective digital main character card, and/or the like. A remaining hit points portion in GUI 1600 can be represented in any suitable manner, such as by a digital D20, D12, or the like, showing the remaining hit points value as the upward-facing side of such digital die.

In response to determining the outcome of a battle phase 1718, the attacking player's turn ends. Accordingly, steps 1708-1718 of method 1718 are a turn 1720 of a digital game system, in accordance with various examples. If the defending digital main character is not defeated (i.e., if the defending digital main character has hit points left after the battle phase of the respective turn), the processor can advance the game causing the player of the defending digital main character to conduct a turn to be the attacking digital main character. Accordingly, proceeding with the example above, in response to opponent digital main character having hit points left after the battle phase in which first player digital main character was attacking opponent digital main player, the processor causes it to be the opponent's turn, during which the opponent digital main character will be the attacking digital main character and the first player digital main character can be the defending digital main character. Accordingly, the processor can repeat method steps 1708-1718 for the opponent's turn, receiving inputs from the opponent to conduct a draw phase (and draw one or more digital actions cards from opponent's digital action card deck), a training phase (and play a digital training card and dispose the digital training card under the opponent main character card, as discussed herein), a preparation phase (and play one or more digital action cards), and a battle phase in which the opponent digital main character attacks the first player digital main character. Any damage resulting from the opponent digital main character's attack during the battle phase can be applied to the first player digital main character. The processor can keep the digital action cards in opponent's hand 1670 facedown from the first player's perspective, and can reveal any digital cards that are played by the opponent to the first player. From the opponent's perspective (from the opponent's own user device 1540), the processor can present the digital action cards in opponent's hand 1670 faceup.

In various examples, for each turn, the processor can receive inputs from both players (e.g., the first player and the opponent) so both can act during steps 1708-1712, and for the battle phase, one player is the attacking player and the other player is the defending player. In such examples, the processor can draw at least one card for each player (step 1708), play at least one digital training card for each player (step 1710), and/or play at least one digital action card for each player (step 1712), then conduct the battle phase. Upon conclusion of the battle phase, if none of the player main characters is defeated (i.e., the main characters each have hit points remaining), the players can switch between being the attacking and defending players, and conduct another turn 1720.

The players can take turns 1720 until a round of the game ends. The outcome of a round can be determined (step 1722). In response to the hit points to one of the digital main characters being reduced to zero, that digital main character is defeated. In response, the defeated digital main character card is placed in a results section of GUI 1600. The defeated digital main character card can be presented in a position to indicate defeat, such as horizontally, at an angle (e.g., a nonparallel, nonorthogonal angle) relative to the edge of the GUI (e.g., the GUI edge proximate to the respective player), facedown, and/or the like. The victorious digital main character card for the other player can be presented in that player's results section of GUI 1600. The victorious digital main character card can be presented in a position to indicate victory, such as vertically, faceup, with accented colors or symbols, and/or the like.

In response to a round ending, the processor can advance a game to the next round (step 1724). For a subsequent round, method 1700 can return to step 1706 to conduct another round 1730. The processor can discard all active digital action cards from the previous round or reshuffle the same back into the digital action card deck. The winning player of the round can select a new digital main character from his/her digital main character deck, and the losing player of the round can select a new digital main character from his/her digital main character deck. The processor can receive such selections and reveal the digital main character selections.

In various examples, the first turn of a first round can comprise all phases of a turn (draw, training, preparation, and battle phases). In various examples, as discussed herein, the player with the first turn of the first round (the very first turn of the game) may not conduct a battle phase to allow the other player to have one turn to prepare for a battle phase. In various examples, the player with the first turn of a second or subsequent round can conduct all phases of a turn (e.g., because it is not the very first turn of the game).

If a game is a single-round game, the game may end with the defeat of the one of the digital main characters. If a game is a multi-round game, the game may end after two of one player's digital main characters are defeated (e.g., one player wins two out of three rounds). A game can continue for any desired number of rounds.

The game and game components disclosed herein, in both physical and electronic versions, may incorporate reasonable design parameters, features, modifications, advantages, and variations that are readily apparent to those skilled in the art in the field of the game design and/or the game industry.

Although a number of different examples and embodiments of the game systems described herein and corresponding methods of playing the game systems have been illustrated and described herein, one or more features of any one embodiment can be combined with one or more features of one or more of the other embodiments.

While a number of exemplary aspects and embodiments of the game system and corresponding method of play have been discussed above, those of skill in the art will recognize certain modifications, permutations, additions and sub-combinations thereof. It is therefore intended that the following appended claims and claims hereafter introduced are interpreted to include all such modifications, permutations, additions, and sub-combinations as are within their true spirit and scope.

Systems, methods and computer program products are provided. In the detailed description herein, references to "various examples", "one example", "an example", etc., indicate that the example described can include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described. After reading the description, it will be apparent to one skilled in the relevant art(s) how to implement the disclosure in alternative examples.

As used herein, "satisfy", "meet", "match", "associated with" or similar phrases can include an identical match, a partial match, meeting certain criteria, matching a subset of data, a correlation, satisfying certain criteria, a correspondence, an association, an algorithmic relationship and/or the like.

Terms and phrases similar to "associate" and/or "associating" can include tagging, flagging, correlating, using a look-up table or any other method or system for indicating or creating a relationship between elements, such as, for example, (i) an attack value or other statistic value (ii), a level, (iii) a training or action card, and/or (iv) a main character card. Moreover, the associating can occur at any point, in response to any suitable action, event, or period of time. The associating can occur at pre-determined intervals, periodic, randomly, once, more than once, or in response to a suitable request or action. Any of the information can be distributed and/or accessed via a software enabled link, wherein the link can be sent via an email, text, post, social network input and/or any other method known in the art.

Unless specifically stated otherwise, as apparent from the discussion herein, it is appreciated that throughout this specification, discussions utilizing terms such as "processing," "computing," "calculating," "determining" or the like refer to actions or processes of a processor, such as a processor on a special purpose computer or a similar special purpose electronic computing device. In the context of this description, therefore, a special purpose computer or a similar special purpose electronic computing device is capable of manipulating or transforming signals, typically represented as physical electronic or magnetic quantities within memories, registers, or other information storage devices, transmission devices, or display screens of the special purpose computer or similar special purpose electronic computing device.

The system and method can be described herein in terms of functional block components, screen shots, optional selections and various processing steps. It should be appreciated that such functional blocks can be realized by any number of hardware and/or software components configured to perform the specified functions. For example, the system can employ various integrated circuit components, e.g., memory elements, processing elements, logic elements, look-up tables, and the like, which can carry out a variety of functions under the control of one or more microprocessors or other control devices. Similarly, the software elements of the system can be implemented with any programming or scripting language such as C, C++, C#, JAVAR, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system can employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module can take the form of a processing apparatus executing code, an internet-based example, an entirely hardware example, or an example combining aspects of the internet, software and hardware. Furthermore, the system can take the form of a computer program product on a computer-readable storage medium having computer-readable program code means embodied in the storage medium. Any suitable computer-readable storage medium can be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various examples. It will be understood that each functional block of the block diagrams and the flowchart illustrations, and combinations of functional blocks in the block diagrams and flowchart illustrations, respectively, can be implemented by computer program instructions.

These computer program instructions can be loaded onto a general-purpose computer, special purpose computer, or other programmable data processing apparatus to produce a machine, such that the instructions that execute on the computer or other programmable data processing apparatus create means for implementing the functions specified in the flowchart block or blocks. These computer program instructions can also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions can also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein can comprise in any number of configurations including the use of WINDOWS®, webpages, web forms, popup WINDOWS®, prompts and the like. It should be further appreciated that the multiple steps as illustrated and described can be combined into single webpages and/or WINDOWS® but have been expanded for the sake of simplicity. In other cases, steps illustrated and described as single process steps can be separated into multiple webpages and/or WINDOWS® but have been combined for simplicity.

For clarity in discussing the various functions of the system, multiple computers and/or servers are discussed as performing different functions. These different computers (or servers) can, however, be implemented in multiple different ways such as modules within a single computer, as nodes of a computer system, etc. The functions performed by the system (or nodes or modules) can be centralized or distributed in any suitable manner across the system and its components, regardless of the location of specific hardware. Furthermore, specific components of the system can be referenced using functional terminology in their names. The function terminology is used solely for purposes of naming convention and to distinguish one element from another in the following discussion. Unless otherwise specified, the name of an element conveys no specific functionality to the element or component. It should be appreciated that, in various examples, the software, hardware, and associated components of the system can be programmed and configured to implement one or more examples described herein. It should also be appreciated that the various aspects of the system can be exemplified as software, modules, nodes, etc., of a computer or server.

As used herein, "transmit," "transfer," and/or the like can include sending electronic data from one system component to another over a network connection. Additionally, as used herein, "data" can include encompassing information such as commands, queries, files, data for storage, and the like in digital or any other form.

As used herein, the term "network" includes any cloud, cloud computing system or electronic communications system or method which incorporates hardware and/or software components. Communication among the parties can be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system can also be implemented using IPX, APPLE® talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. Sec, for example, DILIP NAIK, INTERNET STANDARDS AND PROTOCOLS (1998); JAVAR 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific examples. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, and C" or 'at least one of A, B, or C" is used in the claims or specification, it is intended that the phrase be interpreted to mean that A alone can be present in an example, B alone can be present in an example, C alone can be present in an example, or that any combination of the elements A, B and C can be present in a single example; for example, A and B, A and C, B and C, or A and B and C. Although the disclosure includes a method, it is contemplated that it can be embodied as computer program instructions on a tangible computer-readable carrier, such as a magnetic or optical memory or a magnetic or optical disk. All structural, chemical, and functional equivalents to the elements of the above-described various examples that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but can include other elements not expressly listed or inherent to such process, method, article, or apparatus.

What is claimed is:

1. A method of playing a game on a game surface, comprising:

selecting, by a first player, a player main character card from a player main character deck comprising at least three player main character cards, wherein the player main character card comprises a player hit point value, a player attack value, a player defense value, and a player agility value;

selecting, by a second player, which is an opponent of the first player, an opponent main character card from an opponent main character deck comprising at least three opponent main character cards, wherein the opponent main character card comprises an opponent hit point value, an opponent attack value, an opponent defense value, and an opponent agility value;

drawing, by the first player, a number of player action cards from a player action deck to create a player hand from which the first player plays cards, wherein the player action deck comprises between 40 and 60 action cards including at least one training card, at least one equipment card, at least one single use card, at least one permanent card, at least one instant card, and at least one upgrade card;

drawing, by the opponent, a number of action cards from an opponent action deck to create an opponent hand from which the opponent plays cards, wherein the opponent action deck comprises between 40 and 60 action cards including at least one training card, at least one equipment card, at least one single use card, at least one permanent card, at least one instant card, and at least one upgrade card; and conducting a first battle phase during which the first player is an attacking player and the opponent is a defending player, comprising:

rolling, by the first player, a number of player attack dice that is equal to the player attack value;

determining a player number of successful attacks, wherein a successful attack occurs for each of the player attack dice showing an attack activation value after being rolled;

rolling, by the opponent, a number of opponent defense dice that is equal to the opponent defense value;

determining an opponent number of successful blocks, wherein a successful block occurs for each of the opponent defense dice showing a defense activation value after being rolled;

comparing the player number of the successful attacks and the opponent number of successful blocks; and at least one of:

in response to the player number of the successful attacks being greater than the opponent number of successful blocks by a player attack number, decreasing opponent hit points of the opponent main character card by the player attack number; or in response to the opponent number of the successful blocks being greater than or equal to player number of successful attacks, maintaining the opponent hit points of the opponent main character card.

2. The method of claim 1, wherein, before the comparing the player number of the successful attacks and the opponent number of successful blocks, the first battle phase further comprises:

comparing the player agility value and the opponent agility value; and at least one of:

in response to the player agility value being greater than the opponent agility value by a player agility difference, the first player rerolling a player agility number of the player attack dice equal to the player agility difference, wherein the determining the successful attacks includes the first player rolling the player attack dice and the rerolling the player agility number of the player attack dice; or in response to the opponent agility value being greater than the player agility value by an opponent agility difference, the opponent rerolling an opponent agility number of the opponent defense dice equal to the opponent agility difference, wherein the determining the successful blocks includes the opponent rolling the opponent defense dice and the rerolling the opponent agility number of the opponent defense dice.

3. The method of claim 1, further comprising:

conducting a second battle phase during which the first player is the defending player and the opponent is the attacking player, comprising:

rolling, by the opponent, a number of opponent attack dice that is equal to the opponent attack value;

determining an opponent number of successful attacks, wherein a successful attack occurs for each of the opponent attack dice showing the attack activation value after being rolled rolling, by the first player, a number of player defense dice that is equal to the player defense value;

determining a player number of successful blocks, wherein a successful block occurs for each of the player defense dice showing the defense activation value after being rolled; and comparing the opponent number of the successful attacks and the player number of successful blocks for the second battle phase; and at least one of:

in response to the opponent number of the successful attacks being greater than the player number of successful blocks by an opponent attack number, decreasing player hit points of the player main character card by the opponent attack number; or in response to the player number of the successful blocks being greater than or equal to the opponent number of successful attacks, maintaining the player hit points of the player main character card.

4. The method of claim 1, wherein in response to decreasing the opponent hit points of the opponent main character card by the player attack number, the method further comprises:

ending a round of the game in response to reducing the opponent hit points to zero.

5. The method of claim 4, further comprising:

positioning the opponent main character card facedown in a results area of the game surface; and positioning the player main character card faceup in the results area of the game surface.

6. The method of claim 1, further comprising determining an unblockable number of the player attack dice showing an unblockable attack value, and subtracting the unblockable number from the opponent hit points of the opponent main character card regardless of the opponent number of successful blocks.

7. The method of claim 1, further comprising conducting a training phase before the first battle phase, comprising:

playing, by the first player, a training card from the player hand, which increases at least one of the player attack value, the player defense value, and the player agility value.

8. The method of claim 7, wherein the player attack value, the player defense value, and the player agility value are disposed in a value section that is along and proximate a bottom edge of the player main character card, wherein the player attack value is disposed in a value section first position, wherein the player defense value is disposed in a value section second position, and wherein the player agility value is disposed in a value section third position.

9. The method of claim 8, further comprising:

positioning the training card under the player main character card, with a training card bottom edge protruding below the bottom edge of the player main character card, wherein at least one of:

a value increase to the player attack value is proximate to the training card bottom edge and aligned with the value section first position of the player main character card, a value increase to the player defense value is proximate to the training card bottom edge and aligned with the value section second position of the player main character card, or a value increase to the player agility value is proximate to the training card bottom edge and aligned with the value section third position of the player main character card.

10. The method of claim 1, further comprising conducting a preparation phase before the first battle phase, comprising:

playing, by the first player, an upgrade card from the player hand;

selecting, by the first player, an upgraded player main character card associated with the player main character card from a player upgraded main character deck comprising at least three player upgraded main characters; and upgrading the player main character card to the upgraded player main character card, wherein the upgraded player main character card comprises at least one of an upgraded player hit point value that is greater than the player hit point value, an upgraded player attack value that is greater than the player attack value, an upgraded player defense value that is greater than the player defense value, or an upgraded player agility value that is greater than the player agility value, wherein, in response to upgrading the player main character card, the rolling the player attack dice comprises rolling a number of player attack dice equal to the upgraded player attack value.

11. The method of claim 1, further comprising conducting a preparation phase before the first battle phase, comprising:

playing, by the first player, an equipment card from the player hand, which affects, during each turn, at least one of the number of player attack dice rolled, the number of opponent defense dice rolled, the player number of successful attacks, the opponent number of successful blocks, the player attack value, the player defense value, or the player agility value; and placing the equipment card in a first equipment card section of the game surface in response to the playing the equipment card.

12. The method of claim 1, further comprising conducting a preparation phase before the first battle phase, comprising:

playing, by the first player, a single use card from the player hand, which comprises an effect that affects at least one of the number of player attack dice rolled, the number of opponent defense dice rolled, the player number of successful attacks, the opponent number of successful blocks, the player attack value, the player defense value, or the player agility value; and discarding the single use card in response to the playing the single use card.

13. The method of claim 12, wherein the effect of the single use card is determined by a roll of one or more dice.

14. The method of claim 12, wherein the single use card is an instant card, wherein the effect of the instant card is immediate in response to the playing the single use card and is played in any desired phase of a turn of the game.

15. The method of claim 14, wherein during the preparation phase, the first player is able to play up to one action card, wherein the instant card does not count toward the up to one action card.

16. The method of claim 1, further comprising conducting a preparation phase before the first battle phase, comprising:

playing, by the first player, a permanent card from the player hand, which affects at least one of the number of player attack dice rolled, the number of opponent defense dice rolled, the player number of successful attacks, the opponent number of successful blocks, the player attack value, the player defense value, the player agility value, or hit points remaining of the player hit point value; and placing the permanent card in a permanent card section of the game surface in response to the playing the permanent card, wherein the permanent card remains in play until an end of a round.

17. A system comprising:

a user device comprising a display screen;

a processor operably connected to the user device; and a tangible non-transitory computer readable memory configured to communicate with the processor, the tangible non-transitory computer readable memory having instructions stored thereon that, in response to execution by the processor causes the processor to perform operations comprising:

displaying, by the processor, a player digital main character card on a graphical user interface (GUI), wherein the player digital main character card comprises a player hit point value, a player attack value, a player defense value, and a player agility value;

displaying, by the processor, an opponent digital main character card on the GUI, wherein the opponent digital main character card comprises an opponent hit point value, an opponent attack value, an opponent defense value, and an opponent agility value; and conducting a first battle phase, comprising:

presenting, by the processor, a plurality of player digital attack dice on the GUI;

rolling, by the processor and the random number generator, a number of the player digital attack dice that is equal to the player attack value;

presenting, by the processor, a selected surface of each of the player digital attack dice in response to the rolling the player digital attack dice;

determining, by the processor, a player number of successful attacks, wherein a successful attack occurs for each of the player digital attack dice showing an attack activation value on the selected surface of each of the player digital attack dice;

presenting, by the processor, a plurality of opponent digital defense dice on the GUI;

rolling, by the processor and the random number generator, a number of opponent digital defense dice that is equal to the opponent defense value;

presenting, by the processor, a selected surface of each of the opponent digital defense dice in response to the rolling the opponent digital defense dice;

determining, by the processor, an opponent number of successful blocks, wherein a successful block occurs for each of the opponent digital defense dice showing a defense activation value on the selected surface of each of the opponent digital defense dice;

comparing, by the processor, the player number of the successful attacks and the opponent number of successful blocks; and at least one of:

in response to the player number of the successful attacks being greater than the opponent number of successful blocks by a player attack number, decreasing, by the processor, opponent hit points of the opponent digital main character card by the player attack number; or in response to the opponent number of the successful blocks being greater than or equal to the player number of successful attacks, maintaining, by the processor, the opponent hit points of the opponent digital main character card.

18. The system of claim 17, wherein the operations further comprise, before conducting the first battle phase:

selecting, by the processor and the random number generator, a number of player digital action cards from a player digital action deck to create a player hand from which the first player plays digital cards, wherein the player digital action deck comprises between 40 and 60 digital action cards including at least one digital training card, at least one digital equipment card, at least one digital single use card, at least one digital permanent card, at least one digital instant card, and at least one digital upgrade card;

displaying, by the processor, the number of player digital action cards in the player hand faceup on the GUI;

selecting, by the processor and the random number generator, a number of opponent digital action cards from an opponent digital action deck to create an opponent hand from which the opponent plays digital cards, wherein the opponent digital action deck comprises between 40 and 60 digital action cards including at least one digital training card, at least one digital equipment card, at least one digital single use card, at least one digital permanent card, at least one digital instant card, and at least one digital upgrade card; and displaying, by the processor, the number of opponent digital action cards in the opponent hand facedown on the GUI.

19. The system of claim 17, wherein the operations further comprise, before conducting the first battle phase, conducting a training phase, comprising:

receiving, by the processor, a selection of a digital training card from the player hand, which increases at least one of the player attack value, the player defense value, and the player agility value;

associating, by the processor, the digital training card with the player digital main character card; and increasing, by the processor, the at least one of the player attack value, the player defense value, and the player agility value based on the digital training card.

20. The system of claim 17, wherein the operations further comprise, before conducting the first battle phase, conducting a preparation phase, comprising:

receiving, by the processor, a selection of a digital equipment card from the player hand, which comprises an equipment effect that affects, during each turn, at least one of the number of player digital attack dice rolled, the number of opponent digital defense dice rolled, the player number of successful attacks, the opponent number of successful blocks, the player attack value, the player defense value, or the player agility value;

associating, by the processor, the digital equipment card with the player digital main character card; and effecting, by the processor, the equipment effect during the first battle phase.

\* \* \* \* \*